(12) United States Patent
Scott et al.

(10) Patent No.: US 10,244,597 B1
(45) Date of Patent: Mar. 26, 2019

(54) LUMINAIRE AND SOUND INTEGRATION

(71) Applicant: ABL IP HOLDING LLC, Conyers, GA (US)

(72) Inventors: Jeffrey M. Scott, San Pablo, CA (US); Min-Hao Michael Lu, Castro Valley, CA (US); David P. Ramer, Reston, VA (US); Yan Rodriguez, Suwanee, GA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 16/032,663

(22) Filed: Jul. 11, 2018

(51) Int. Cl.
| | | |
|---|---|---|
| H05B 37/02 | (2006.01) |
| H05B 33/08 | (2006.01) |
| H04R 1/02 | (2006.01) |
| H04R 1/08 | (2006.01) |
| G06F 3/16 | (2006.01) |
| G10L 15/22 | (2006.01) |

(52) U.S. Cl.
CPC ......... *H05B 33/0845* (2013.01); *G06F 3/167* (2013.01); *G10L 15/22* (2013.01); *H04R 1/025* (2013.01); *H04R 1/083* (2013.01); *H05B 33/0857* (2013.01); *G06F 3/16* (2013.01); *H05B 37/0227* (2013.01); *H05B 37/0236* (2013.01)

(58) Field of Classification Search
CPC .... G06F 3/16; H05B 37/0227; H05B 37/0236
See application file for complete search history.

(56) References Cited

U.S. PATENT DOCUMENTS

| | | | |
|---|---|---|---|
| 6,548,967 B1 | 4/2003 | Dowling et al. | |
| 9,303,863 B2 | 4/2016 | Vaidya | |
| 9,462,663 B2 | 10/2016 | Aggarwal et al. | |
| 9,784,417 B1 * | 10/2017 | Springer | H05B 37/0227 |
| 9,883,570 B1 | 1/2018 | Turvy et al. | |
| 9,916,738 B2 | 3/2018 | Lashina et al. | |
| 2007/0109763 A1 * | 5/2007 | Wolf | A01M 1/2083 362/86 |

OTHER PUBLICATIONS

U.S. Appl. No. 15/631,441, filed Jun. 23, 2017—61 pages.
U.S. Appl. No. 15/866,659, filed Jan. 10, 2018—61 pages.
U.S. Appl. No. 15/933,752, filed Mar. 23, 2018—56 pages.
(Continued)

*Primary Examiner* — Thuy Vinh Tran
(74) *Attorney, Agent, or Firm* — RatnerPrestia

(57) ABSTRACT

A system includes a luminaire having a light source, a lighting control device to control a light output and operation of the light source in an area of the luminaire, and a sound transducer integrated on a surface of a panel of the luminaire. The sound transducer responds to vibration of the panel to detect incoming audio waves. An audio front end device includes an audio coder responsive to analog signals from the sound transducer, and is coupled to an output of the sound transducer. The lighting control device includes programming that configures a processor to control the audio front end device to receive the analog signals from the sound transducer and provide a digital output signal, process the digital output signals to generate a responsive result that is supplied to the lighting control device in the area of the luminaire.

20 Claims, 17 Drawing Sheets

(56) References Cited

OTHER PUBLICATIONS

U.S. Appl. No. 15/948,401, filed Apr. 9, 2018—41 pages.
Recessed Speaker Light with Bluetooth Wireless Technology, https://www.acuitybrands.com/brands/lighting/lithonia-lighting/speakerlight.
DigiKey Electronics ASX03604R, Digi-Key Part No. 668-1560-ND, www.digikey.com/products, searched Nov. 15, 2018.
Radio Shack, "Understanding Telephone Electronics," The Conventional Telephone Set, pp. 2-20-2-24, Texas Instruments Learning Center (1983).

* cited by examiner

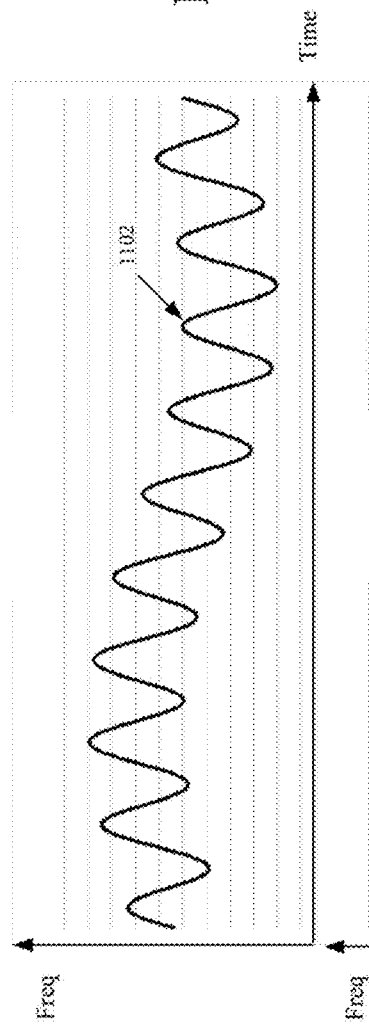
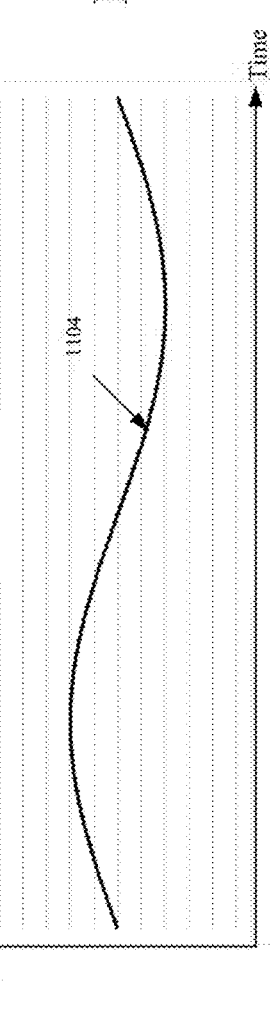
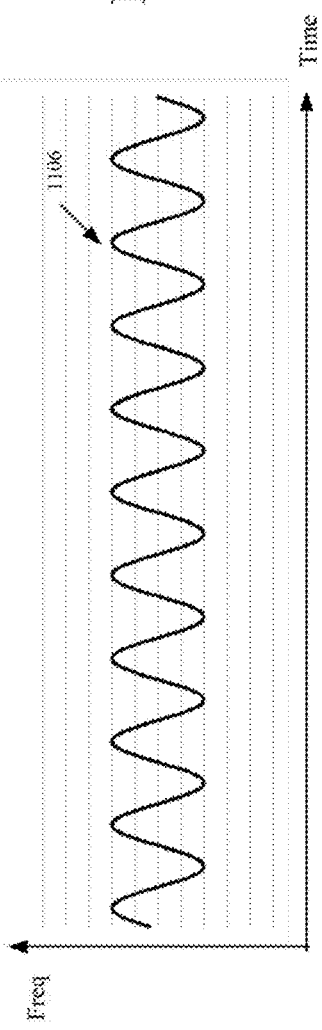
FIG. 11A
FIG. 11B
FIG. 11C

LUMINAIRE AND SOUND INTEGRATION

TECHNICAL FIELD

The present subject matter relates to techniques and equipment of a lighting system, and/or operations thereof, where the lighting system includes a sound transducer integrated on a surface of an element of a luminaire to form an audio pickup device.

BACKGROUND

Electrical lighting has become commonplace in modern society. Electrical lighting devices are commonly used, for example, in homes, buildings of commercial and other enterprise establishments, as well as in various outdoor settings. Since the advent of light emitters, such as light emitting diodes (LEDs), for general lighting type illumination application, lighting equipment has become increasingly intelligent with incorporation of sensors, programmed controller and network communication capabilities. Typical luminaires generally have been a single purpose lighting device that includes a light source to provide artificial general illumination of a particular area or space.

Multiple lighting devices are often utilized to provide general illumination to an entire region, such as an entire floor of an office, commercial establishment, auditorium or classroom. Traditionally, such lighting devices are distributed in a pattern across the ceiling of the region under illumination so as to optimize lighting of the space of an intended use. In order to provide sound or other audio capabilities to the entire region having the multiple lighting devices, conventional speakers are typically separately mounted to the ceiling and other surfaces within the region. The conventional speakers require an aperture or other pathway for the acoustic wave to pass through.

A need exists for providing audio capabilities, for example to an entire region having multiple lighting devices, that would reduce the clutter of ceiling mounted, wall mounted or stand-alone conventional speakers, improve aesthetics, and save costs.

SUMMARY

The concepts disclosed herein alleviate the above noted problems with providing sound and audio capabilities in a lighting system.

A system uses a sound transducer integrated on a surface of a panel of a luminaire to respond to vibration of the panel to detect incoming audio waves in a vicinity of the luminaire. Signals output from the sound transducer may be processed in various ways in support of different applications or use cases for the audio capability of the system. In several examples, the sound transducer output signals are processed to provide an audio command to a lighting control device of the luminaire to control an operation of the light source in the area of the luminaire.

In an example, a system may include a data network and a luminaire. The luminaire includes a light source, driver circuitry coupled to the light source to provide power to the light source, a lighting control device coupled to the driver circuitry to control a light output and operations of the light source in an area of the luminaire, and a network interface to enable the luminaire to receive communication via the data network. A housing element of the luminaire is susceptible to acoustic or audio waves in the area of the luminaire. The luminaire also includes a sound transducer integrated on a surface of the luminaire panel. The sound transducer is configured to respond to vibration of the panel to detect incoming audio waves in the vicinity of the luminaire. An audio front end device is coupled to an output of the sound transducer. The front end device includes an audio coder responsive to analog signals from the sound transducer. The lighting control device includes a processor coupled to the driver circuitry, the network interface and the audio front end device, and memory coupled to be accessible to the processor where the memory stores programming for execution by the processor and data to be stored or processed by the processor during execution of instructions included in the programming. The execution of the programming in the memory configures the processor to: control the audio front end device to receive the analog signal from the sound transducer and provide a digital output signal, process the digital output signal to generate a responsive result, based upon the digital output signal, and supply the responsive result to the lighting control device in the area of the luminaire.

In another example, a system may include a data network and a luminaire. The luminaire includes a light source, driver circuitry coupled to the light source to provide power to the light source, and a lighting control device coupled to the driver circuitry to control a light output and operation of the light source in an area of the luminaire. A network interface enables the luminaire to receive communication via the data network. At least two panels of the luminaire are susceptible to acoustic waves in a vicinity of the luminaire. A first sound transducer is integrated on a surface of a first of the panels of the luminaire, and the first sound transducer is configured to respond to vibrations of the first panel to detect incoming audio waves in the vicinity of the luminaire. A second sound transducer is integrated on a surface of a second of the panels of the luminaire, and the second sound transducer is configured to output an audio signal in the vicinity of the luminaire. An audio front end device is coupled to an output of the first sound transducer and to an input of the second sound transducer. The lighting control device of the luminaire comprises a processor coupled to the driver circuitry, the network interface, and the audio front end device. A memory is coupled to be accessible to the processor, and the memory stores programming for execution by the processor and data to be stored or processed by the processor during execution of instructions included in the programming. Execution of the programming in the memory configures the processor to: control the audio front end device to receive the analog signal from the first sound transducer and provide a digital output signal; process the digital output signal to generate an audio responsive command based upon the digital output signal; supply the audio responsive command to the lighting control device to control the light output and operation of the light source in the area of the luminaire; and transmit a portion of the audio responsive command having an audible component to the input of the second sound transducer for audible output from the second sound transducer.

In another example, a system may include a luminaire having a light source; a panel configured as: a reflector optically coupled to an output of the light source, a diffuser optically coupled to an output of the light source, or as an integral component of a housing of the luminaire at least partially enclosing the light source; and a sound transducer integrated on a surface of the panel of the luminaire. The sound transducer is configured to respond to vibration of the panel to detect incoming audio waves in a vicinity of the luminaire such that the sound transducer and panel form an audio pickup device; and circuitry, responsive to an audio frequency output signal from the sound transducer.

Additional advantages and novel features of the examples will be set forth in part in the description that follows, and in part will become apparent to those skilled in the art upon examination of the following and the accompanying drawings or may be learned by production or operation of the examples. The advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accordance with the present concepts, by way of example only, not by way of limitations. In the figures, like reference numerals refer to the same or similar elements.

FIG. 3A is a profile view of an example sound transducer that operates in the lighting system of FIG. 1. FIG. 3B is a bottom view of the example sound transducer that operates in the lighting system of FIG. 1.

FIG. 6A is a cross-sectional view of a single integrated sound transducer integrated on a housing element of the luminaire and configured to provide a microphone function in the lighting system of FIG. 1. FIG. 6B is a cross-sectional view of an example luminaire having more than one sound transducer integrated on different panels of the luminaire with one providing a microphone function and the other providing a speaker function in the lighting system of FIG. 1. FIG. 6C is a cross-sectional view of an example luminaire having a single sound transducer integrated on a diffuser of the luminaire and configured to provide a microphone function. FIG. 6D is a cross-sectional view of an example luminaire having a single transducer integrated on a surface of a waveguide of the luminaire, and configured to provide a microphone function. FIG. 6E is a cross-sectional view of an edge-lit luminaire having a single transducer integrated on a surface of a reflector or diffuser element of the luminaire and configured to function as a microphone. FIG. 6F is a cross-sectional view of an edge-lit luminaire having a single transducer integrated on a surface of a waveguide of the luminaire, and configured to provide a microphone function. FIG. 6G is a cross-sectional view of a luminaire having more than one sound transducer integrated on different areas of housing elements of the luminaire with one sound transducer providing a microphone function and the other sound transducer providing a speaker function.

FIGS. 11A, 11B, and 11C illustrate an example of signal processing used in the audio front end device to subtract a speaker's output from a total detected audio signal to provide a resulting audio signal output from the luminaire in the lighting system of FIG. 1.

DETAILED DESCRIPTION

Figure 1:
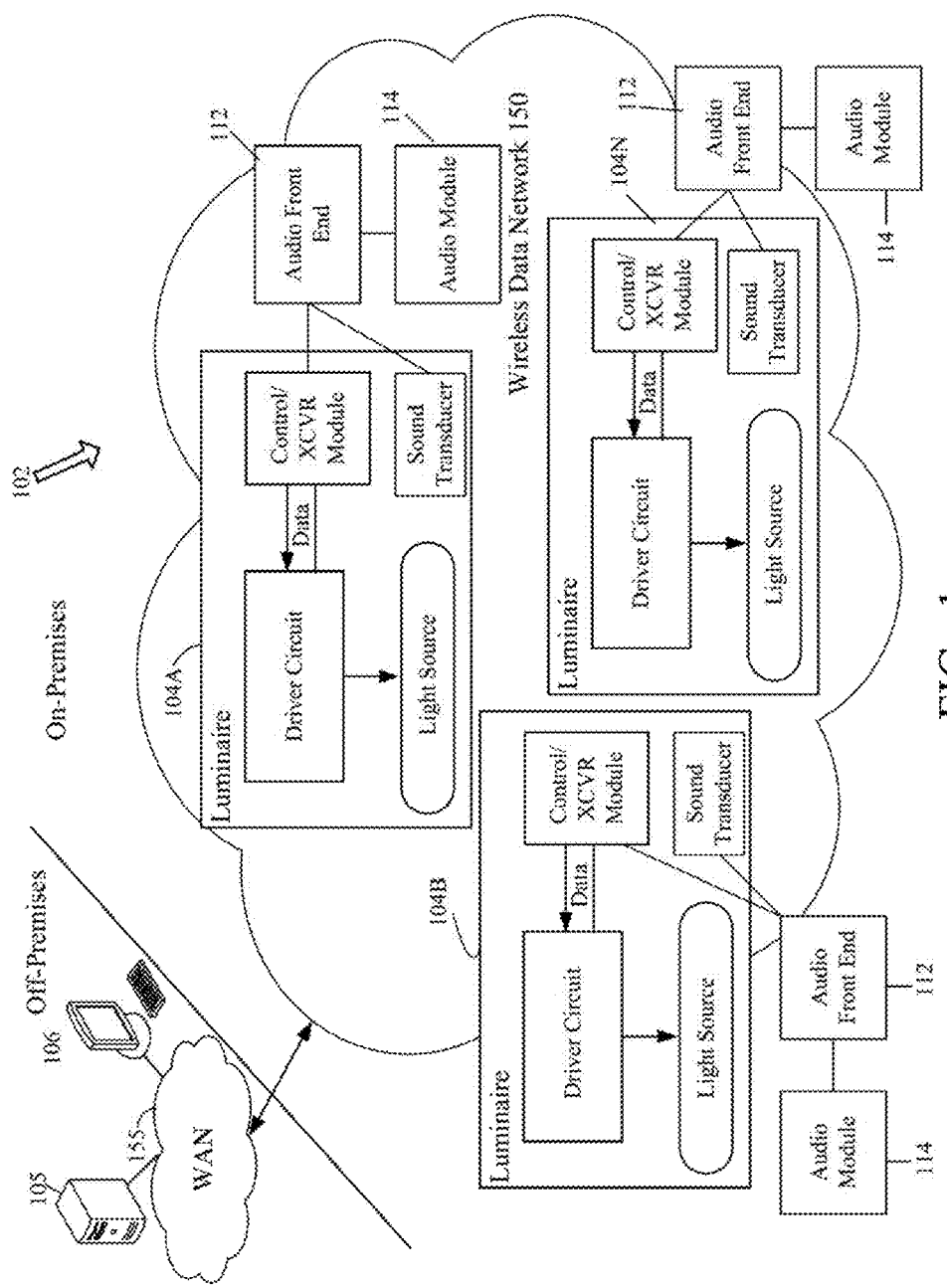
FIG. 1 is a functional block diagram of an example of a lighting system of networks and devices that provide a variety of lighting capabilities and include components configured to provide at least an integrated microphone function.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to a lighting system including a luminaire having functionality of a light source to illuminate an area and a sound transducer integrated on a panel of the luminaire, where the panel is susceptible to acoustic waves in a vicinity of the luminaire. The sound transducer is configured to respond to acoustic vibrations of the panel to detect incoming audio waves in the vicinity of the luminaire.

The term "luminaire," as used herein, is intended to encompass essentially any type of device that processes energy to generate or supply artificial light, for example, for general illumination of a space intended for use of occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the luminaire(s) illuminate a space or area of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

Terms such as "artificial lighting," as used herein, are intended to encompass essentially any type of lighting that a device produces light by processing of electrical power to generate the light. An artificial lighting device, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type. The illumination light output of an artificial illumination type luminaire, for example, may have an intensity and/or other characteristic (s) that satisfy an industry acceptable performance standard for a general lighting application.

In the examples below, the luminaire includes at least one or more components forming a light source for generating illumination light as well as a co-located sound transducer device, e.g., integrated/combined with the lighting component(s) of the light source into the one structure of the luminaire. The co-located sound transducer is a device coupled to a panel or the like of the luminaire to detect incoming audio waves in the vicinity of the luminaire.

In several illustrated examples, such a combinatorial luminaire may take the form of a light fixture, such as a pendant or drop light or a downlight, or wall wash light or the like. Other fixture mounting arrangements are possible. For example, at least some implementations of the luminaire may be surface mounted on or recess mounted in a wall, ceiling or floor. Orientation of the luminaires and components thereof are shown in the drawings and described below by way of non-limiting examples only. The luminaire with lighting component(s) and the sound transducer device may take other forms, such as lamps (e.g. table or floor lamps or street lamps) or the like. Additional devices, such as fixed or controllable optical elements, may be included in the luminaire, e.g. to distribute light output from the illumination light source.

Terms such as 'lighting system" or "lighting apparatus" as used herein, are intended to encompass essentially any combination of an example of a luminaire discussed herein with other elements such as electronics and/or support structure, to operate and/or install the particular luminaire implementation. Such electronics hardware, for example, may include some or all of the appropriate driver(s) for the illumination light source and the sound transducer device, any associated control processor or alternative higher level control circuitry, and/or data communication interface(s). As noted, the lighting component(s) and sound transducer are co-located into an integral unit, such as a light fixture or lamp implementation of the luminaire. The electronics for driving and/or controlling the lighting component(s) and the sound transducer component may be incorporated within the luminaire or located separately and coupled by appropriate means to the light source component(s) and the sound transducer device.

In several of the examples, the lighting system is software configurable, by programming instructions and/or setting data, e.g. which may be communicated to a processor of the lighting system via a data communication network of a lighting system. Configurable aspects of the sound transducer device operation may include one or more parameters (such as various sound related characteristics to be manipulated by signal processing) of an audio input or output via vibration of the panel of the luminaire to detect incoming audio waves in the vicinity of the luminaire.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Light output from the luminaire may carry information, such as a code (e.g. to identify the luminaire or its location) or downstream transmission of communication signaling and/or user data. The light based data transmission may involve modulation or otherwise adjusting parameters (e.g. intensity, color characteristic or distribution) of the illumination light output from the device.

Detailed references to examples illustrated in the accompanying drawings and discussed below are provided. Although specific examples are provided for lighting or illumination of an area, the sound transducer integrated on the luminaire and disclosed features are not limited to control of light sources in the lighting systems, and may be adapted to provide sound integration for user inputs and control of other device functions or building management system (BMS) control such as building access and security systems, audio systems, thermostat control in heating, ventilation and air conditioning (HVAC), humidifiers, water flow/control, or any combination of connected Internet of Things (IoT) devices or home appliances.

Reference now is made in detail to the examples illustrated in the accompanying drawings and discussed below. FIG. 1 is a functional block diagram of an example of a lighting system of networks and devices that provide a variety of lighting capabilities and include components configured to provide at least an integrated microphone function. Some later examples also incorporate a speaker functionality.

In FIG. 1, a lighting system 102 using, for example, a wireless data network 150 and devices that provide a variety of lighting capabilities, includes communication in support of lighting functions such as turning lights on/off, dimming, and utilizes a luminaire 104A-104N, for example, integrated with a sound transducer configured to respond to vibration of a panel of the luminaire to detect incoming audio waves in a vicinity of the lighting system 102. It would be understood that the term "lighting control device" means a device that includes a controller (e.g. a Control XCVR module or microprocessor unit) that executes a lighting application for communication, in the example, over a wireless lighting network communication band, of control and systems operations information during control network operations over the lighting network communication band and during associated detection and processing of incoming audio waves in a vicinity of the luminaire 104A-104N. Alternatively, although the lighting system 102 is shown communicating to/from the wireless data network 150, the system 102 may use wired communication via wired links or optical fibers and a local area network (LAN) or the like.

A lighting system 102 may be designed for indoor commercial spaces, although the system may be used in outdoor or residential settings. As illustrated in FIG. 1, system 102 includes a variety of lighting control devices, such as a set of lighting devices (a.k.a luminaires or light fixtures) 104A-104N. The luminaires 104A-104N include sound transducers integrated on a surface of a panel which is an element of the luminaire 104A-104N susceptible to acoustic waves in a vicinity of the luminaire 104A-104N in the lighting system 102. The housing element may be a housing panel, a reflector, a diffuser or the like. Examples of the sound transducer integrated on the surface of the panel of the luminaire 104A-104N are described and illustrated further detail below.

At a high level, audio wave detection via a sound transducer may be used to control operation of the luminaire that includes the transducer, to control operation of that luminaire and some number of other luminaires or to control other equipment. Also or alternatively, such audio wave detection, via a sound transducer, may be used to detect and send messages about sonic events like gunshots or glass breakage, for digital audio recording, voice assistance for lighting or building management control, audio based positioning with one or more luminaires integrated with a sound transducer to provide audio pick up as for an alarm system or search and rescue, integration with a telephone system, e.g., conference calls, enhanced person-to-person voice communication in a large room, geologic, physiologic or weather event monitoring, e.g., wind, earthquake, equipment vibrations, or process white noise with subtle variation in noise to provide navigational cues to the visually impaired.

The example wireless data network 150 may use any available standard wireless data communication technology, such as WiFi, Bluetooth, ZigBee, LiFi, etc. LiFi is a form of visible light communication and a subset of optical wireless communication (OWC), and uses light from light-emitting diodes (LEDs) as a medium to deliver networked, mobile, high-speed communication in a similar manner to WiFi with the exception that WiFi utilizes radio waves, while LiFi uses visible light. Alternatively, the wireless data network may use a proprietary protocol and/or operate in an available unregulated frequency band, such as the protocol implemented in nLight® Air products, which transport lighting control messages on the 900 MHz band (an example of which is disclosed in U.S. Pat. No. 9,883,570 to Turvy, entitled "Protocol for Lighting Control Via a Wireless Network," the entire contents of which are incorporated herein by reference). The system may support a number of different lighting control protocols, for example, for installations in which consumer selected luminaires of different types are configured for a number of different lighting control protocols. Further, the devices of the lighting system 102 are not limited by the nLight® network, and may be configured to communicate using another backbone network architecture and protocol known in the art, for example, 0-10v, Digital Addressable Lighting (DALI), BACnet, digital multiplex (DMX), RDX, Phase-Cut, etc. Communications may use any suitable wired or wireless media.

Cat5 type cabling may be used between the devices for the wired communication via a local area network (LAN, e.g., Intranet). The cable type example of the data network may use any available standard data communication technology, such as Ethernet, RS485, PLC, or the like.

Communications may also occur between the lighting system 102 and a server 105 through a network such as wide area network (WAN, e.g., Internet) 155. The WAN 155 outside/off premises, may be an intranet or the Internet, for example. Although FIG. 1 depicts server 105 as located off premises and accessible via the WAN 155, any one of the luminaires 104A-104N, for example are configured to communicate results related to detection and processing of incoming audio waves in the vicinity of the lighting system 102 to devices such as the server 105 or even, for example, a laptop 106 located off premises.

The on-premises in FIG. 1 may be any location or locations serviced for lighting and other purposed by a networked intelligent system of the type described herein. The luminaires 104A-104N are located to provide lighting service in various areas in or about the premises. Most of the examples discussed below focus on building installations, for convenience, although the system may be readily adapted to outdoor lighting. Hence, lighting system 102 provides lighting, and other services, such as building management system (BMS) control, for example, building access and security systems, audio systems, thermostat control in heating, ventilation and air conditioning (HVAC), humidifiers, water flow/control, or any combination of connected Internet of Things (IoT) devices or home appliances, in a number of service areas in or associated with a building, such as various room, hallways, corridors or storage areas of a building and an outdoor areas associated with the building.

Figure 2:
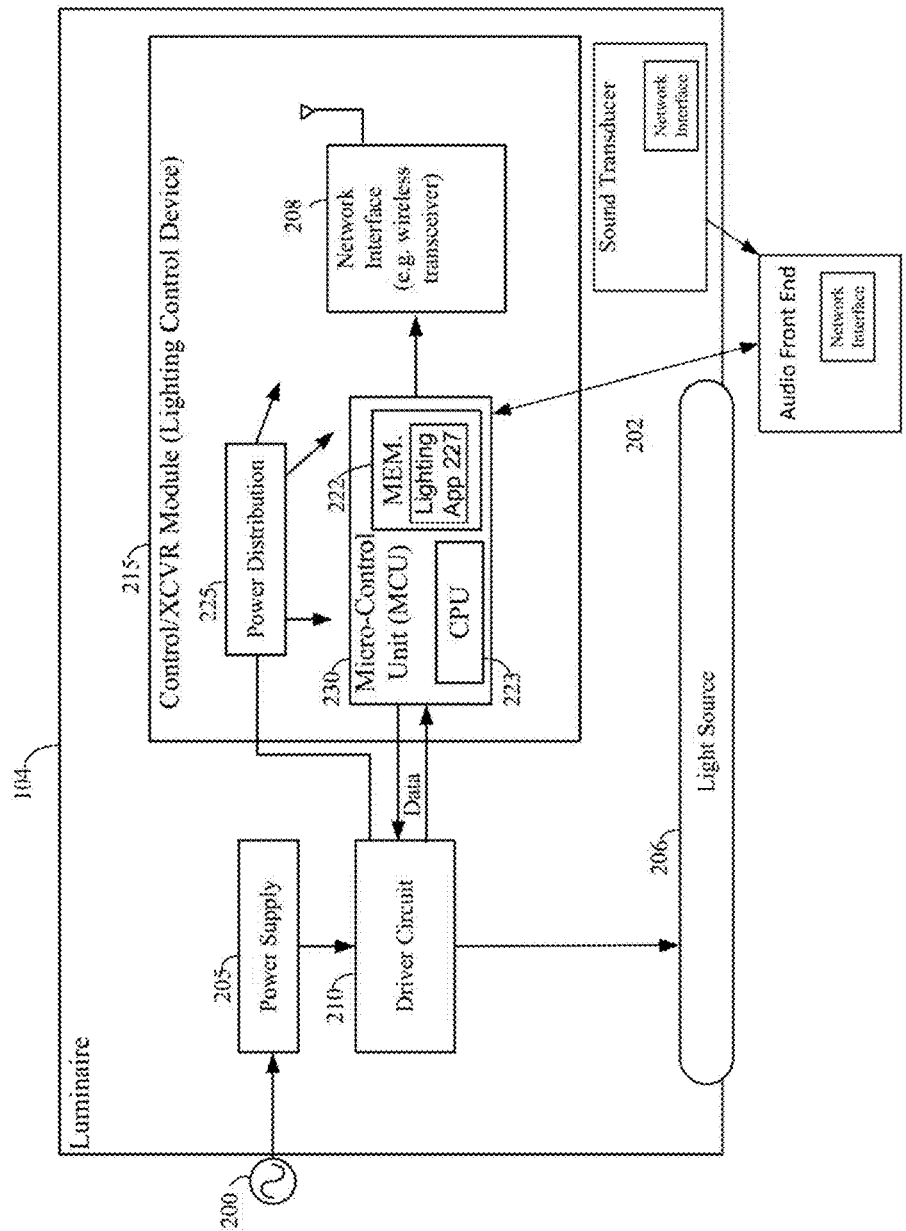
FIG. 2 is a block diagram of an example luminaire that operates in and communicates via the lighting system of FIG. 1.

FIG. 2 is a block diagram of an example luminaire that operates in and communicates via the lighting system of FIG. 1. Luminaire 104 is an integrated lighting device that generally includes a power supply 205 driven by a power source 200. Power supply 205 receives power from the power source 200, such as an AC main, battery, solar panel, or any other AC or DC source. Power supply 205 may include a magnetic transformer, electronic transformer, switching converter, rectifier, or any other similar type of circuitry to convert an input power signal into a power signal suitable for luminaire 104.

Luminaire 104 further includes a driver circuit 210, for example an intelligent LED driver circuit, control XCVR module 215, and a light source 206. Light source 206 can be of a single or multiple variable light intensity and/or colors. Also, the light source 206 can be a light emitting diode (LED), organic light emitting diode (OLED), electroluminescent, or other appropriate light source. In most examples, the luminaire 104 illuminates a service area to level useful for a human in or passing through the space, e.g. regular illumination of a room or corridor in a building such as a store, and/or provide an indoor visible light source based positioning system. For purposes of example, the light source 206 may be a LED-type light, however, the light source 206 may be virtually any type of light source suitable to providing the intended type of light output that may be electronically controlled. The light source 206 may be of the same general type in all of the luminaires 104A-104N, e.g. all formed by some number of light emitting diodes (LEDs), although in may installations, some number of luminaires 104A-104N by have different types of light sources 206, e.g. some use LEDs, some use compact or tube type fluorescent sources, etc. Additionally, daylight or ambient light sensors, motion sensors, proximity sensors, occupancy and vacancy sensors, audio, temperature, infrared sensors, ultrasonic sensors or other environmental sensors and the like may be embedded in the luminaires to further enhance the detection and processing of audio waves in the area of the luminaire.

The driver circuit 210 is coupled to light source 206, which as indicated above may be an LED light source, and drives the light source 206 by regulating the power to the light source 206 to provide a constant quantity or power to light source 206 as its electrical properties change with temperature, for example. Driver circuit 210 may be a constant-voltage driver, constant-current driver, or AC driver type circuit that provides dimming through a pulse width modulation circuit and may have many channels for separate control of different LEDs or LED) arrays that could make up the light source 206. An example of a commercially available intelligent driver circuit 201 is manufactured by EldoLED.

Driver circuit 210 can further include an AC or DC current source or voltage source, a regulator, an amplifier (such as a linear amplifier or switching amplifier), a buck, booset, or buck/boost converter, or any other similar type of circuit or component. Driver circuit 210 outputs a variable voltage or current to the light source 206 that may include a DC offset, such that an average value is nonzero, and/or an AC voltage.

Control/XCVR module 215 includes power distribution circuitry 225 and a micro-control unit (MCU) 230. As illustrated in FIG. 2, MCU 230 is coupled to the driver circuit 210 and controls the light source operation of the light sources 206. MCU 230 includes a memory 222 (volatile and non-volatile) and a central processing unit (CPU) 223 that are coupled by a network interface 208. The CPU 223 is also coupled to communicate via the network interface 208 and the network link with one or more others of the luminaires or devices of the system of FIG. 1. The network interface for each of the devices, for example, the lighting control device 215, audio front end device 112, and audio module 114 may be a wireless transceiver. The MCU 230 and the CPU 223 may be implemented via hardwired logic circuitry, but in the examples, the processor is a programmable processor such as a central processing unit (CPU) 223 of a microcontroller or microprocessor. The memory 222 stores programming for execution by the CPU 223 of the micro-control unit 230 and data that is available to be processed or has been processed by the CPU 223. The memory for example, may include a lighting application 227 (which can be firmware) for both detecting incoming sound waves and lighting control operations. The processors and memories in the luminaires may be substantially the same throughout the devices 104A-104N on-premises, or different luminaires 104A-104N may have different processor 223 and/or different amounts of memory 222, depending on differences in intended or expected processing needs. The power distribution circuitry 225 distributes power and ground voltages to the MCU 230 and wireless transceiver 208 to provide reliable operation of the various circuitry on the Control/XCVR module 215.

The network interface 208 in each luminaire 104 in a particular service area will be of a physical type and configured to operate in a manner that is compatible with the physical media and electrical protocol(s) implemented for the particular service area and/or throughout the premises of the system. Although FIG. 2 shows the luminaire 104 having one network interface 208, some or all of the luminaires 104 may have two or more network interfaces 208 to enable data communication over different media with the network(s) and/or with other devices in the vicinity.

Luminaire 104 further includes a sound transducer 202. The sound transducer 202 may be internally or externally integrated, via an adhesive to mechanical attachment, on a surface of a panel of the luminaire such that the sound transducer 202 responds to vibrations of the panel to detect incoming audio waves in a vicinity of the luminaire. The sound transducer 202 is configured to communicate with the control/XCVR 215 via the network interface 208 and the data network 150.

In the examples, the control/XCVR module 215, sound transducer 202 and the network interface 208 are shown as integrated with the other elements of the luminaire 104 or attached to the luminaire 104 or other elements that incorporate the light source 206. However, for some installations, the light source 206 may be attached in such a way that there is some separation between the luminaire or other element that incorporates the electronic components that provide the intelligence and communication capabilities. For example, the communication components and possibly the CPU 223 and memory 222 may be elements of a separate device of component coupled and/or collocated with the luminaire 104. Additionally, an audio front end device 112 and an audio module 114 (each described below) may be coupled internally or externally to components of the luminaire 104.

FIG. 3A is a profile view of an example sound transducer that operates in the lighting system of FIG. 1. FIG. 3B is a bottom view of the example sound transducer that operates in the lighting system of FIG. 1.

As illustrated in FIG. 3A, sound transducer 202 is a device configured to detect acoustic or sound waves and vibrations of frequencies of about 0-20 KHz. and convert the detected vibrations into corresponding frequency electrical signals. The bottom surface of the sound transducer 202 intimately contacts the surface of a rigid housing element of the luminaire. Sound transducer 202 includes at least two leads that directly connects to circuitry components or devices of the luminaire 104. The housing element is susceptible to acoustic waves in a vicinity of the luminaire. When the sound transducer 202 is attached to the luminaire 104, incoming acoustic or sound waves vibrate as they reach the surface of the housing element. The vibrations on the surface of the housing element, for example, a housing panel are detected, and the sound transducer outputs electrical signals via the at least two leads of the sound transducer 202, for example, in the form of an analog output signal of the detected audio waves having a voltage or current that is proportional to the incoming acoustic waves acting upon the panel/diaphragm of the luminaire 104. FIG. 3B illustrates a bottom view of the sound transducer 202 which may be adhesively or mechanically attached to the surface of the housing element or panel of the luminaire.

Figure 4B:
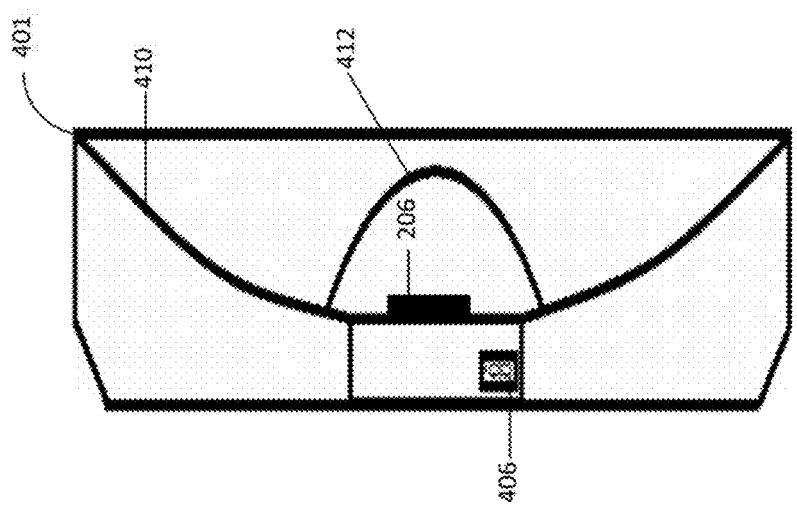
FIG. 4B is a cross-section view of the example luminaire that operates in the lighting system of FIG. 1.
Figure 4A:
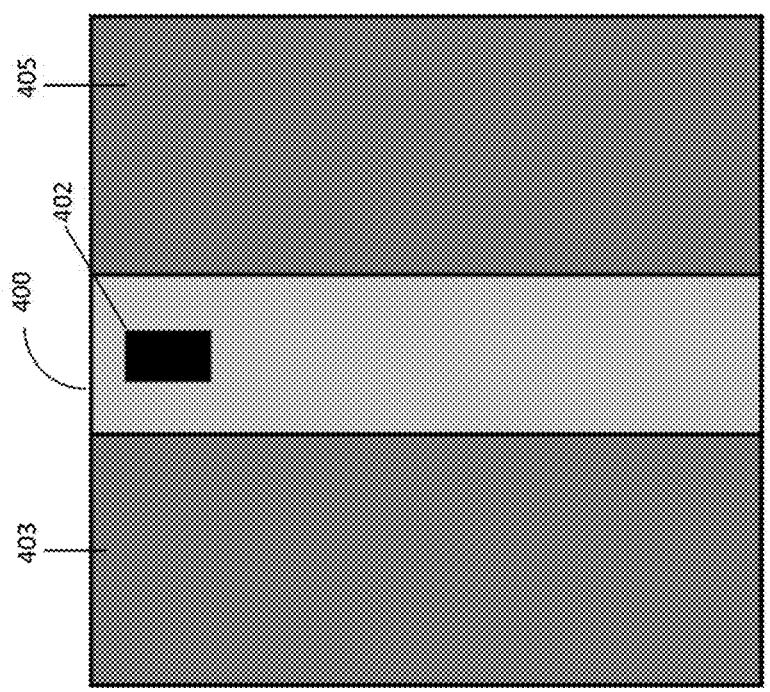
FIG. 4A is a top view of an example luminaire that operates in the lighting system of FIG. 1.

FIG. 4A is a top view of an example luminaire that operates in the lighting system of FIG. 1. As illustrated in FIG. 4A, the top surface 400 of the luminaire includes, for example, two rigid, housing elements (403/405) that may be a housing panel, a reflector, a diffuser, or the like. A wiring port 402 provides access to wiring and power connections for the luminaire. FIG. 4B is a cross-section view of an example luminaire that operates in the lighting system of FIG. 1. As illustrated in FIG. 4B, a cross-sectional view of the luminaire 401 includes, light source 206, a reflector 410, a diffuser 412 optically coupled to the output of the light source 206 and at least partially enclosing the light source 206, and for wired communications, access 406 for connectors such as RJ45 connectors.

Figure 5B:
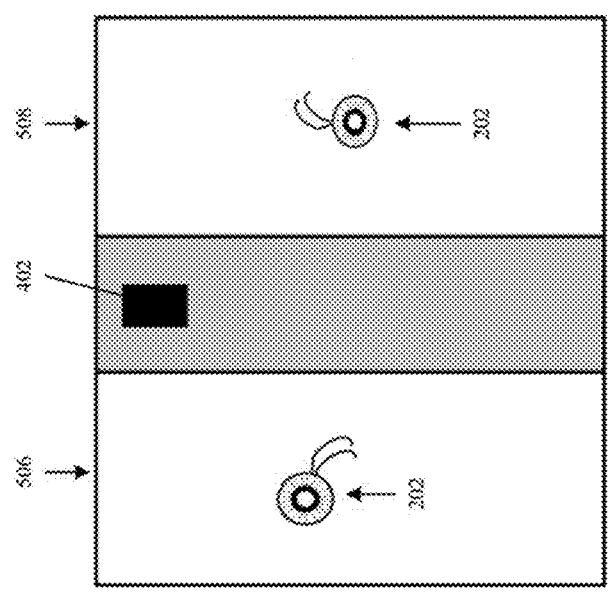
FIG. 5B is a top view of an example luminaire having sound transducers integrated on multiple housing elements of the luminaire to provide different functions and operate in the lighting system of FIG. 1.
Figure 5A:
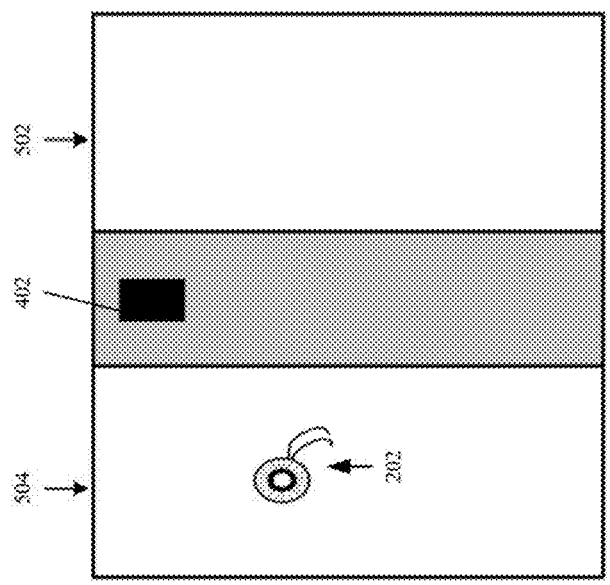
FIG. 5A is a top view of an example luminaire having a sound transducer integrated on a housing element of the luminaire and operates in the lighting system of FIG. 1.

FIG. 5A is a top view of an example luminaire having a sound transducer integrated on a housing element of the luminaire that operates in the lighting system of FIG. 1. In FIG. 5A, an example luminaire includes two housing elements, housing panels 502/504, that are configured to be susceptible to acoustic waves in a vicinity of the luminaire. The housing elements of the luminaire may be a housing panel, a reflector, a diffuser, or the like. For example, the housing element may be a diffuser 412 that is optically coupled to an output of a light source 206 (as illustrated in FIG. 4B) or as an integral component of a housing of the luminaire that at least partially encloses the light source 206. The number of housing elements is not limited to two, and may include less than or more than two, for example, housing panels. The luminaire of FIG. 5A further includes a sound transducer 202. The housing elements 502/504 are transparent to illustrate the sound transducer 202 integrated on the opposite surface. As illustrated, sound transducer 202 is attached to housing panel 504, and provides audio pick-up or a microphone function in the lighting system. The integration of the sound transducer 202 on the luminaire is based upon the design requirements or the installer's preference with respect to which housing panel 502/504 or other housing element is selected, and the physical location or orientation of the sound transducer 202 on the housing panel.

FIG. 5B is a top view of an example luminaire having two sound transducers integrated on multiple housing elements of the luminaire to provide different functions and operate in the lighting system of FIG. 1. Similar to the example of FIG. 5A, the example luminaire in FIG. 5B includes two rigid housing elements, for example housing panels 506/508, which are susceptible to acoustic waves in a vicinity of the luminaire. The luminaire further includes, for example, two sound transducers 202 integrated on a surface of each of the housing elements or housing panels 506/508. The housing elements 506/508 are transparent to illustrate the sound transducers 202 integrated on the opposite surface. Alternatively, each housing element may be configured as a diffuser 412 optically coupled to an output of a light source 206 (as illustrated in FIG. 4B) or as an integral component of the housing of the luminaire. In another example, one of the housing elements may be configured as a diffuser and the other housing element may be configured as the component of the housing, or the housing elements may each be different walls of the housing of the luminaire. In the example of FIG. 5B, multiple transducers may be integrated on different housing elements of the luminaire to provide different functions. For example, the sound transducer 202 integrated on housing panel 506 may provide audio pick-up or a microphone function, and the sound transducer 202 integrated on housing panel 506 may provide audio output or a speaker function in the lighting system.

Figure 6A:
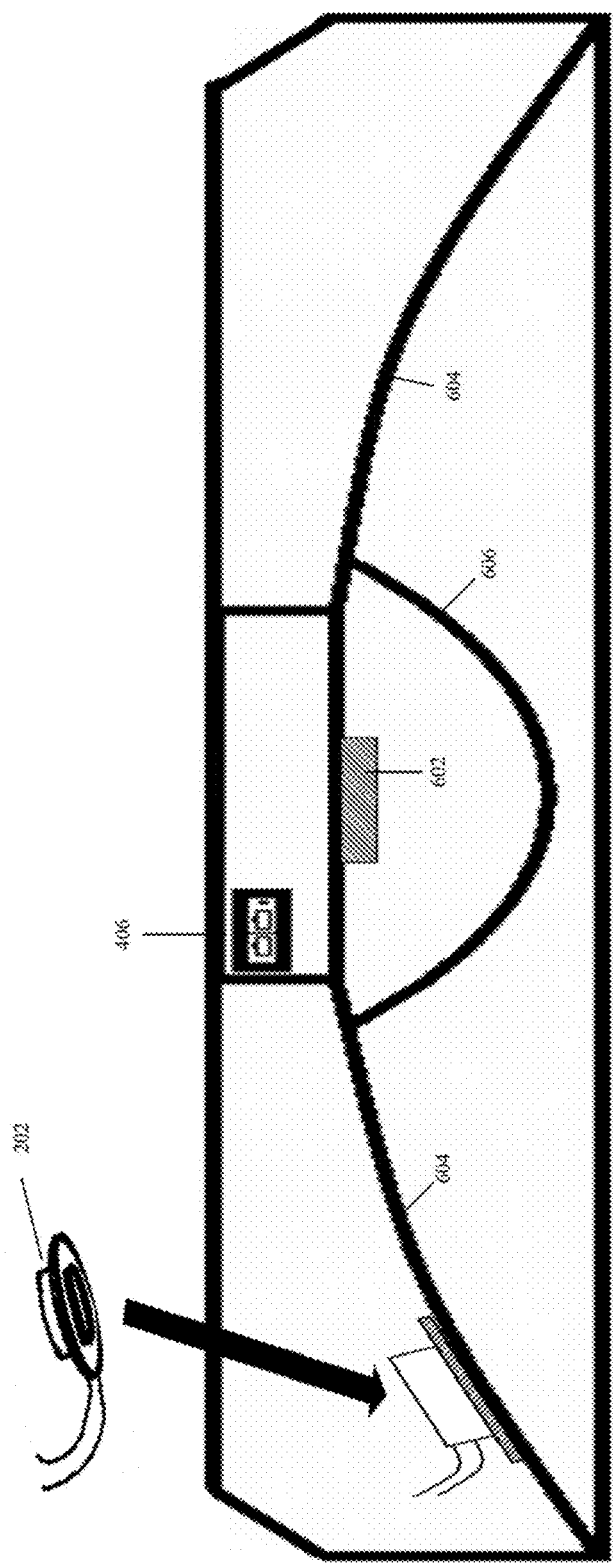
FIGS. 6A, 6B, 6C, 6D, 6E, 6F, and 6G illustrate various cross-sectional views of an example luminaire having at least one sound transducer integrated on the surface of a housing element of the luminaire.

FIG. 6A is a cross-sectional view of an example luminaire having a single sound transducer integrated on the surface of a housing element of a luminaire, and configured to provide an audio-pickup function or a microphone function in the lighting system of FIG. 1. The luminaire in the example of FIG. 6A includes, a light source 602 optically coupled to a diffuser 606, an access area 406 for connectors, such as RJ45 connectors, reflectors 604, and a single sound transducer 202 integrated on a surface of a housing panel such that the sound transducer attached on the panel of the luminaire forms an audio pickup device to provide, for example, an audio pickup or a microphone function in the lighting system. As illustrated in FIG. 6A and further described below, the housing elements of the luminaire may also include a diffuser 606 or reflector 604 on which the sound transducer 202 is attached to form an audio pickup device.

Figure 6B:
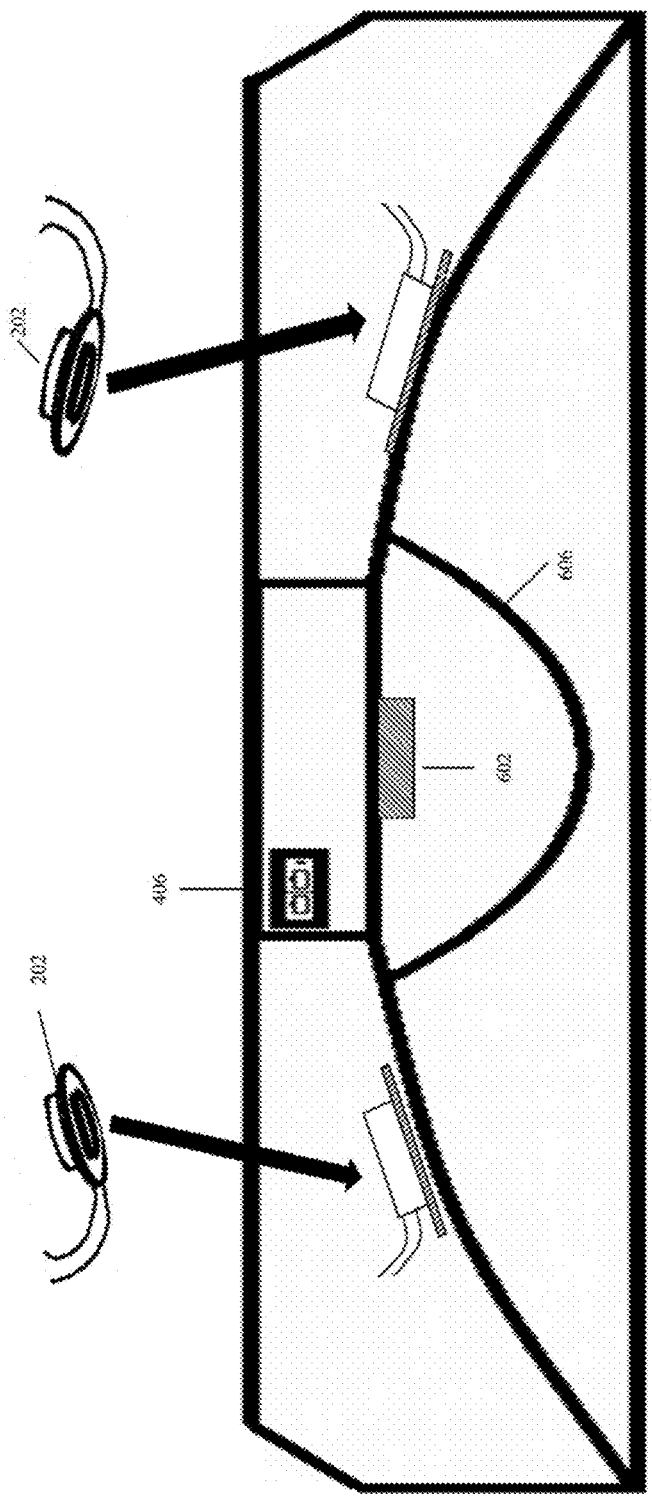

FIG. 6B is a cross-sectional view of an example luminaire having more than one sound transducer integrated on different housing element of the luminaire with one sound transducer providing a microphone function and the other sound transducer providing a speaker function in the lighting system of FIG. 1. The luminaire in the example of FIG. 6B includes, a light source 602, a diffuser 606, an access area 406 for connectors, such as RJ45 connectors, reflectors 604, and more than one, specifically two as illustrated, sound transducers 202 integrated on different housing panels of the luminaire. Similar to discussed above with respect to FIG. 5B, a first of the sound transducers 202 provides, for example, an audio pickup or a microphone function, and a second of the sound transducers 202 provides, for example, a speaker/audio output function.

Figure 6C:
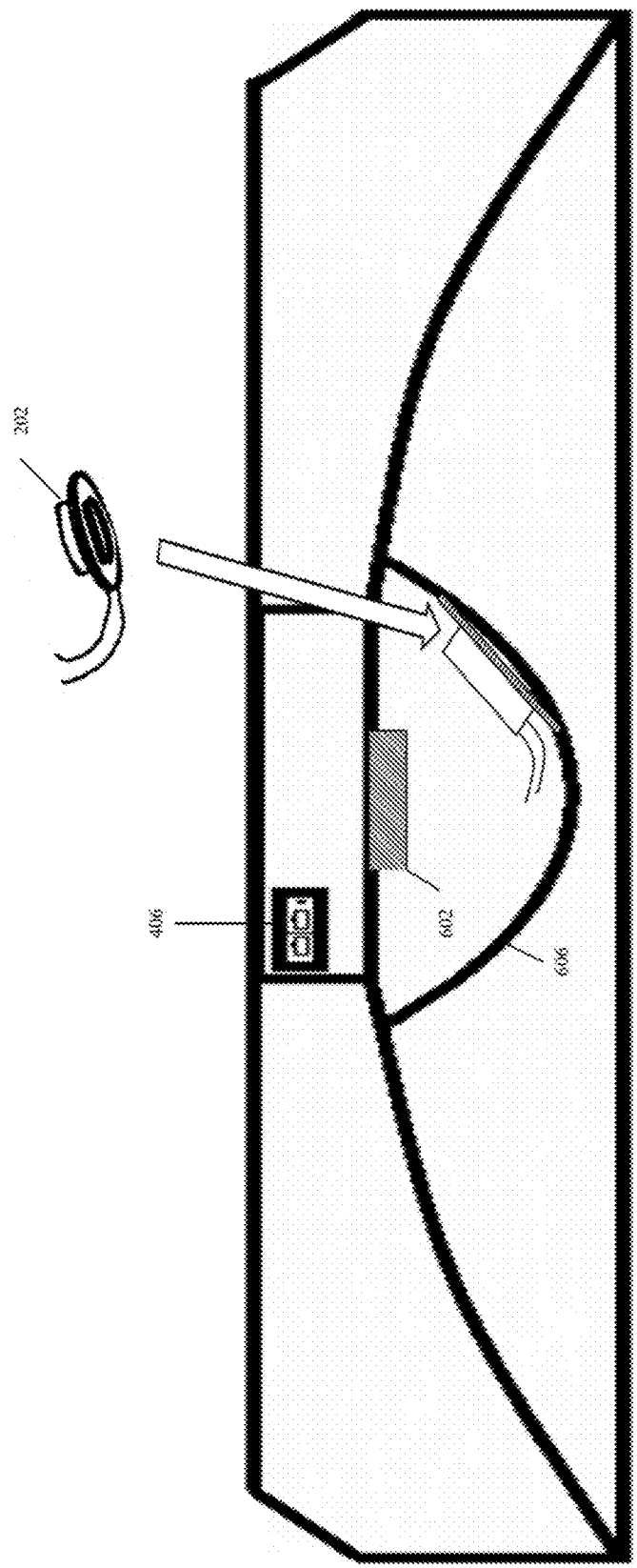

FIG. 6C is a cross-sectional view of an example luminaire having a single sound transducer integrated on a surface of a housing element of the luminaire, and configured to provide a microphone function. In FIG. 6C, the luminaire includes a light source 602, a diffuser 606 optically coupled to the light source 602, an access area 406 for connectors, such as RJ45 connectors, and a sound transducer 202 integrated on a surface of the diffuser 606.

Figure 6D:
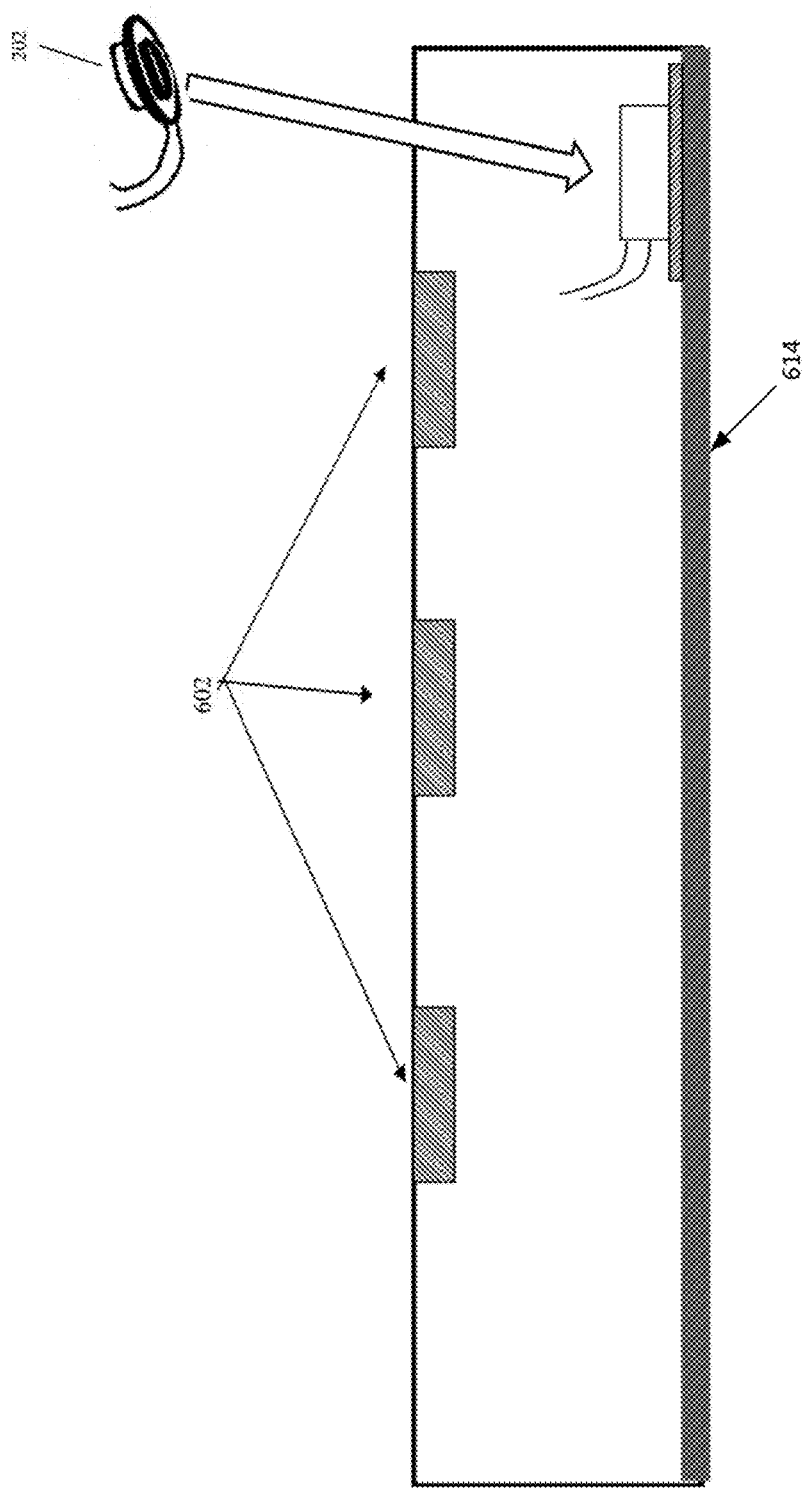

FIG. 6D is a cross-sectional view of an example luminaire having a single sound transducer integrated on a surface of a housing element of the luminaire, and configured to provide a microphone function in the area of the luminaire. In FIG. 6D, the luminaire includes a plurality of light sources 602, and a waveguide 614. A sound transducer 202 is integrated on a surface of the waveguide 614 and configured to provide a microphone function in the area of the luminaire.

Figure 6E:
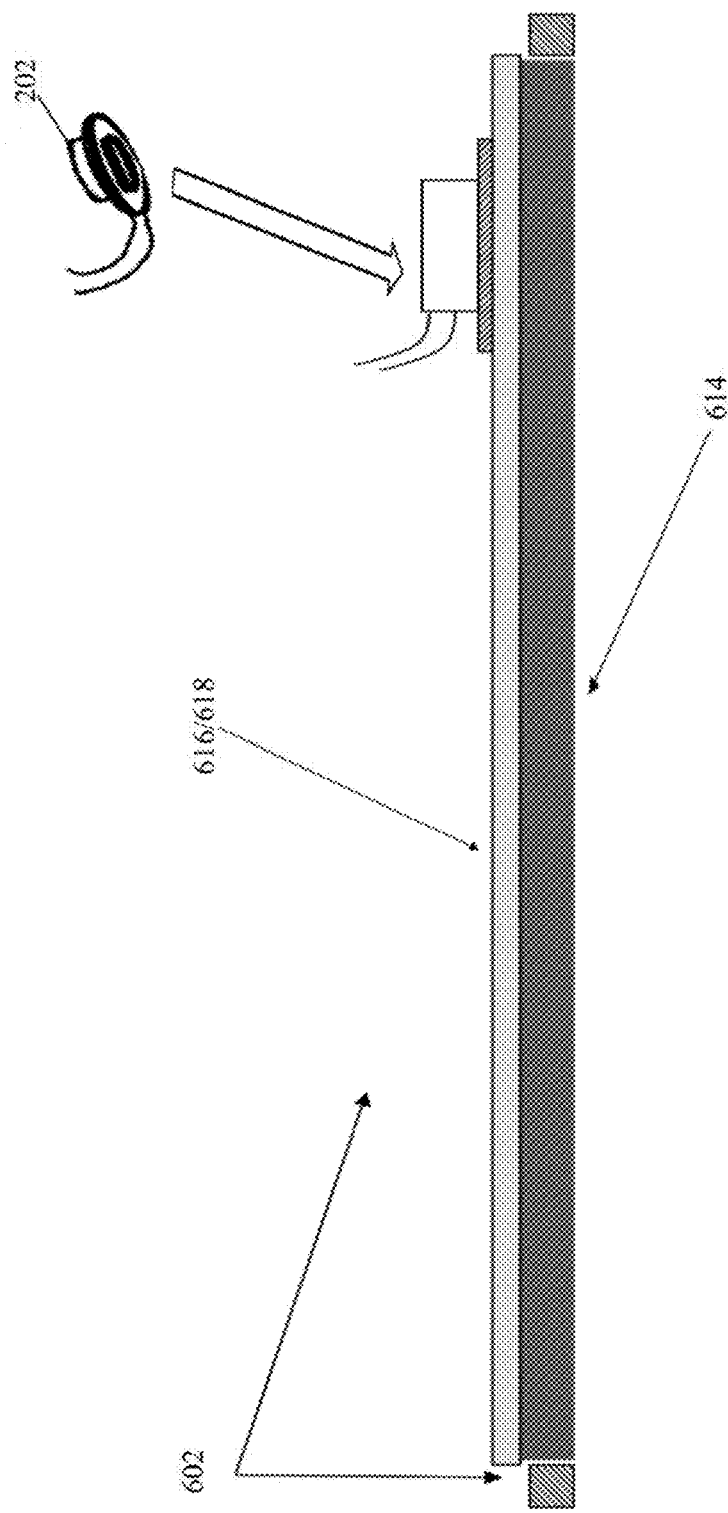

FIG. 6E is a cross-sectional view of an edge-lit luminaire having a single transducer integrated on a surface of a housing element of the luminaire. As illustrated in FIG. 6E, the housing elements 602 may be a reflector 616 or diffuser 618. Light sources 602 are located on respective edges of, for example, a linear suspended edge-lit luminaire. In an alternative example, the edge-lit luminaire may not include a reflector 616 or diffuser 618, in which case, the sound transducer may be integrated on the surface of another rigid housing element of the luminaire, for example, a waveguide 614. The sound transducer 202, integrated on the surface of the reflector 616, diffuser 618, or the waveguide 614, is configured to provide a microphone function in the area of the edge-lit luminaire.

Figure 6F:
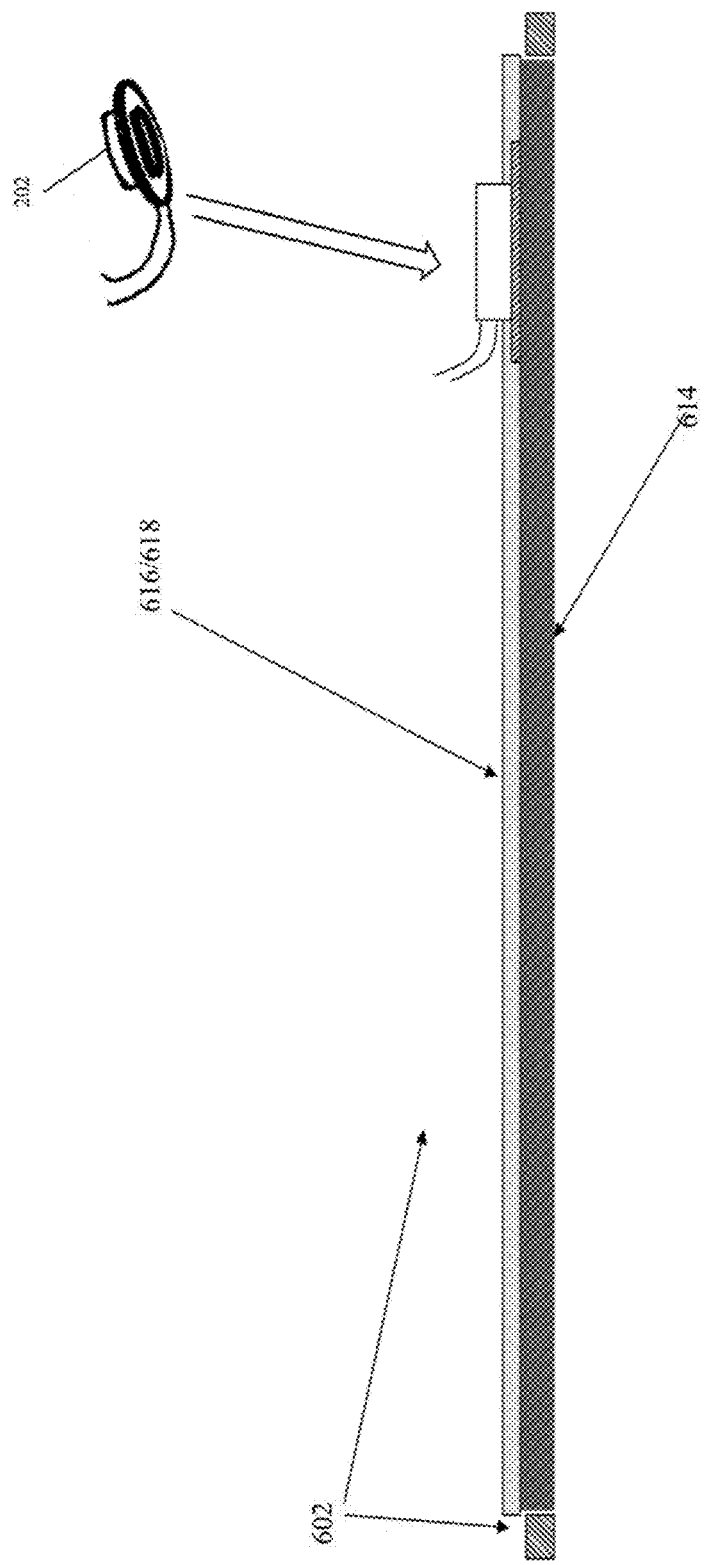

FIG. 6F is a cross-sectional view of an edge-lit luminaire having a single transducer integrated on a surface of a housing element of the luminaire. As illustrated in FIG. 6F, the housing element is a waveguide 614. The edge-lit luminaire may further include housing elements such as a reflector 616 and diffuser 618. Light sources 602 are located on respective edges or ends of, for example, a linear suspended edge-lit luminaire. The sound transducer 202 is integrated on a surface of the waveguide 614, and configured to provide a microphone function in the area of the edge-lit luminaire. In another implementation, optical cladding may be arranged between the bottom surface of the sound transducer 202 and the wave guide 614 to ensure proper operation of the waveguide 614.

Figure 6G:
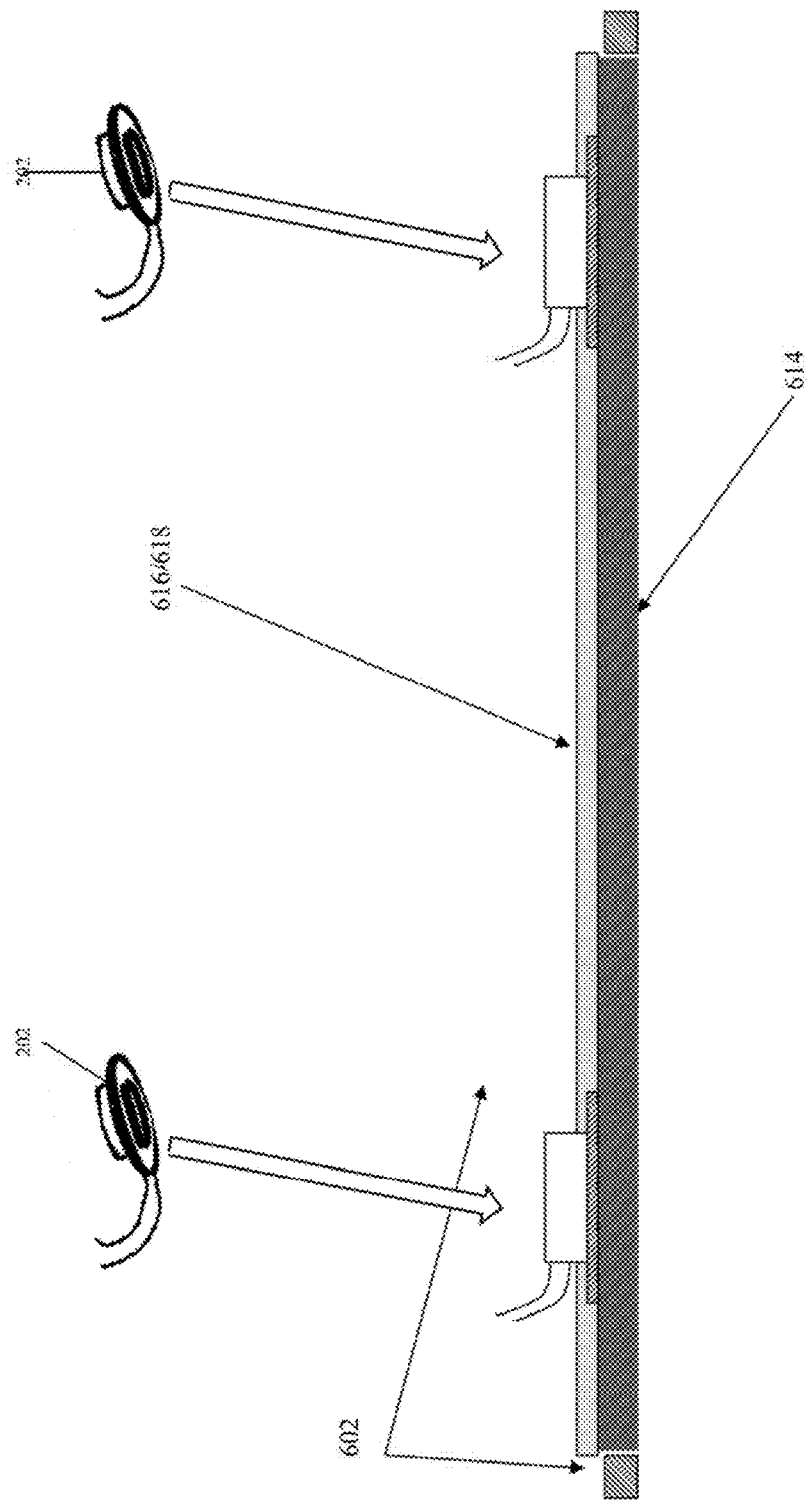

FIG. 6G is a cross-sectional view of a luminaire having more than one sound transducer integrated on different areas of housing elements of the luminaire with one sound transducer providing a microphone function, and the other sound transducer providing an audio output or speaker function. As illustrated in FIG. 6G, light sources 602 are located on respective ends or edges of, for example, a linear suspended edge-lit luminaire. In the example of FIG. 6G, the luminaire includes housing elements such as a reflector 616, diffuser 618, and waveguide 614. The sound transducers 202 are each integrated on a surface of the housing element, for example, wave guide 614. One of the sound transducers 202 is configured to provide a microphone function, and the other sound transducer 202 is configured to provide an audio output or speaker function in the area of the edge-lit luminaire. In another implementation, optical cladding may be arranged between the bottom surface of each sound transducer 202 and the waveguide 614 to ensure proper operation of the waveguide 614. In another example, the sound transducers 202 may each be attached to different housing elements of the luminaire, for example, one sound transducer may be attached to the surface of the waveguide 614 and the other sound transducer may be attached to the surface of the reflector 616 or diffuser 618.

Figure 7:
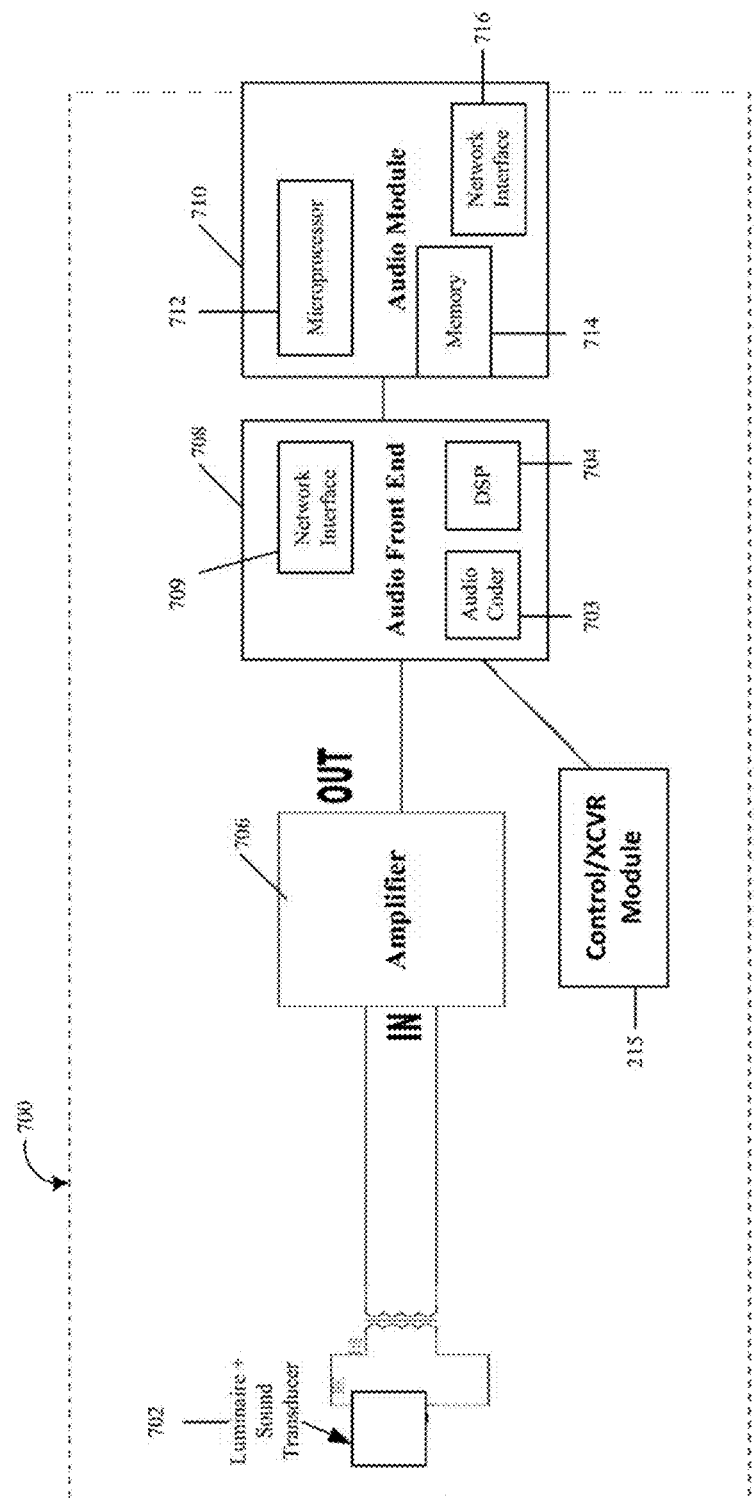
FIG. 7 illustrates example devices and circuitry for a more detailed explanation of a luminaire having a single sound transducer integrated thereon and driven to provide a microphone function in the lighting system of FIG. 1.

FIG. 7 illustrates example devices and circuitry for a more detailed explanation of a luminaire having a single sound transducer integrated thereon and driven to provide a microphone function in the lighting system of FIG. 1. Additional components of the luminaire such as the power supply, driver circuit, light source and control/XCVR module are a part of the luminaire, and were described above in FIG. 2. However, for ease of explanation, the description and illustration of these components are not repeated. As shown, the luminaire 700 includes the sound transducer implemented on a surface of a housing element of the luminaire 702. As discussed above, the sound transducer is configured to respond to an acoustic vibration of the housing element, for example, housing panels of the luminaire. The vibrations on the panel of the luminaire result in acoustic waves that act upon the diaphragm created by the sound transducer contacting the surface of the panel of the luminaire. The acoustic waves are converted to electrical signals by the sound transducer. In particular, the sound transducer and luminaire 702 are connected, via a transformer, to the input of an amplifier 706 that amplifies the audio-frequency of electrical signals output by sound transducer 702 via the transformer. The amplified signals are analog signals representing the detected incoming audio signals. The amplified signals from the amplifier 706 are supplied to the audio front end device 708. In the example illustrated in FIG. 7, the amplifier 706 is located outside the audio front end device 708. In another example, the amplifier 706 is located in the audio front end device 708.

In one implementation, the audio front end device 708 receives amplified analog audio signals from the amplifier 706. The amplified analog signals represent the incoming audio waves in the vicinity of the luminaire 104 as discussed above with respect to FIG. 1. The audio front end device 708 includes an audio coder 703 that converts the audio signals to digital input signals. Because the audio output/speaker function and audio pick-up/microphone function are acoustically coupled through the housing of the luminaire, the sound transducer functioning as microphone can easily pick up the speaker output; therefore, this output needs to be subtracted from the microphone input. This is the context for signal processing (DSP). A digital signal processor (DSP) 704 is coupled to the audio coder 703 to receive the digital input signals from the audio coder 703. A DSP is a programmable processor, much like a microprocessor, where the circuitry forming DSP is optimized for digital signal processing functions. The operations of the DSP 704 are configurable in response to instructions from other logic, such as microprocessor 712 of the audio module 710 and/or the control/XCVR module (lighting control device) 215, for example, to process, compress, or manipulate or perform mathematical functions like "add", "subtract," or multiply/divide.

The particular operation(s) of the DSP 704 can be selected/defined by instructions, based on a particular application or use case of the system 700. The DSP 704 may utilize, for example, an adaptive algorithm to analyze a waveform of the incoming signals (converted) and/or a waveform of noise associated with the incoming audio waves represented by the digital input signals, and generates a digital output signal. Depending on the instructions to the DSP and its corresponding signal processing configuration, the digital output signal for example, may represent a responsive result, for example, a lighting command, to control an operation of a light source in the area of the luminaire, or the digital output signal may represent at least one of a phase shifter waveform or an inverted polarity waveform relative to the waveform of the noise. When the digital output signal is processed to generate a responsive result that is, for example, a lighting command, the responsive result is supplied to the control/XCVR module (lighting control device) 215 to control an operation of the light source 206 in the area of the luminaire 104. The responsive result may correspond to a user's command or cry for help, a noise indicative of human presence in an area, a noise with a signature of a gunshot, glass breaking, etc. In another implementation, the responsive result is a command to another device in the area to control additional operations in the system, for example, HVAC, building access and security, or other BMS operations and functions. The operations commands may also control: intensity, color temperature, pre-set scenes operations related the system network, for example, network status check or reporting, audio file recording and playback, establishing audio communication channels, or relay web query and response.

In an implementation, an audio module 710 is coupled to an output of the audio front end device 708. The audio module includes a microprocessor 712 and a memory 714. The output from the audio front end device 708 to the audio module 710 is the digital output signal from the DSP 704. The microprocessor 712 of the audio module 710 processes and stores the digital output signal as audio data in the memory 714. The audio data may be stored in, for example, an audio coding format such as a MP3 format.

Figure 8:
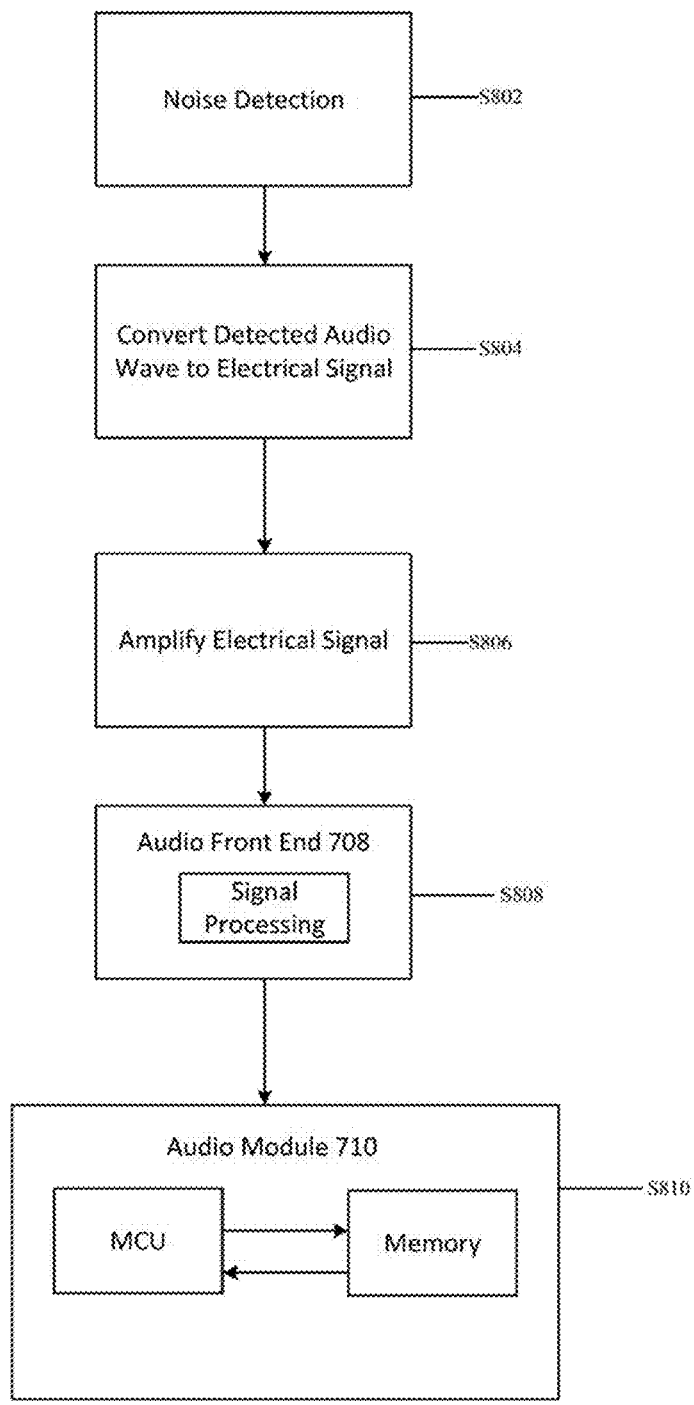
FIG. 8 illustrates an example of the signal flow of a luminaire having a single sound transducer integrated thereon and providing an audio pick-up or microphone function in the lighting system of FIG. 1.

FIG. 8 illustrates an example of the signal flow of a luminaire having a single sound transducer integrated thereon and providing an audio pick-up or microphone function in the lighting system of FIG. 1. As described above, for example, in FIG. 5A, a sound transducer 202 is integrated on a surface of a housing element such as housing panel 504 of a luminaire 104. The housing element, for example, housing panel 504 is susceptible to acoustic waves in a vicinity of the luminaire 104. The sound transducer 202 is configured to respond to vibrations of incoming audio waves as they reach the surface of the panel. At S802, acoustic or audio waves in the vicinity of the luminaire cause the panel of the luminaire to vibrate as a diaphragm as the incoming waves reach the surface of the panel. As a result, the incoming audio waves are detected.

At S804, the detected incoming audio waves are converted to corresponding frequency electrical signals. At S806, the output of sound transducer is coupled to amplifier 706 such that an amplitude of the audio frequency electrical signals output by the sound transducer via the transformer is increased.

At S808, the amplified audio frequency electrical signals are analog signals and are transmitted to the audio front end device 708 for signal processing. In the implementation of FIG. 7, the audio front end device 708 includes an analog-to-digital (AD) converter or an audio coder 703 that converts the analog audio signals to digital signals. The audio coder 703 is coupled to a digital signal processor (DSP) 704 that is configured to receive the digital input signals from the audio coder 703 to generate a responsive result, based upon the digital signal input signal. As discussed above, a DSP is a programmable processor, much like a microprocessor, where the circuitry forming the DSP is optimized for digital signal processing functions. Audio processing at the DSP 704 includes, for example, signal conditioning, leveling, balancing, noise suppression, etc., may be used to generate the responsive result. In the implementation of a lighting system, the responsive result, which may be, for example, a lighting control command, is supplied to a lighting control device to control an operation of the light source in the area of the luminaire, for example, ON/OFF, dimming, etc. The responsive result can be a command supplied to the control/XCVR module 215 in a signal format or data communication protocol to control additional building management system (BMS) control such as thermostats, HVAC, sound systems, building access and security, etc.

At S810, an audio module 710 is coupled to the output of the audio front end device 708 to receive the analog signal output from the audio front end device 708. A microprocessor 712 of the audio module 710 processes the digital signal output from the audio front end device 709 to generate audio data that is stored as an audio file, for example, MP3 format, in memory 714.

Figure 9:
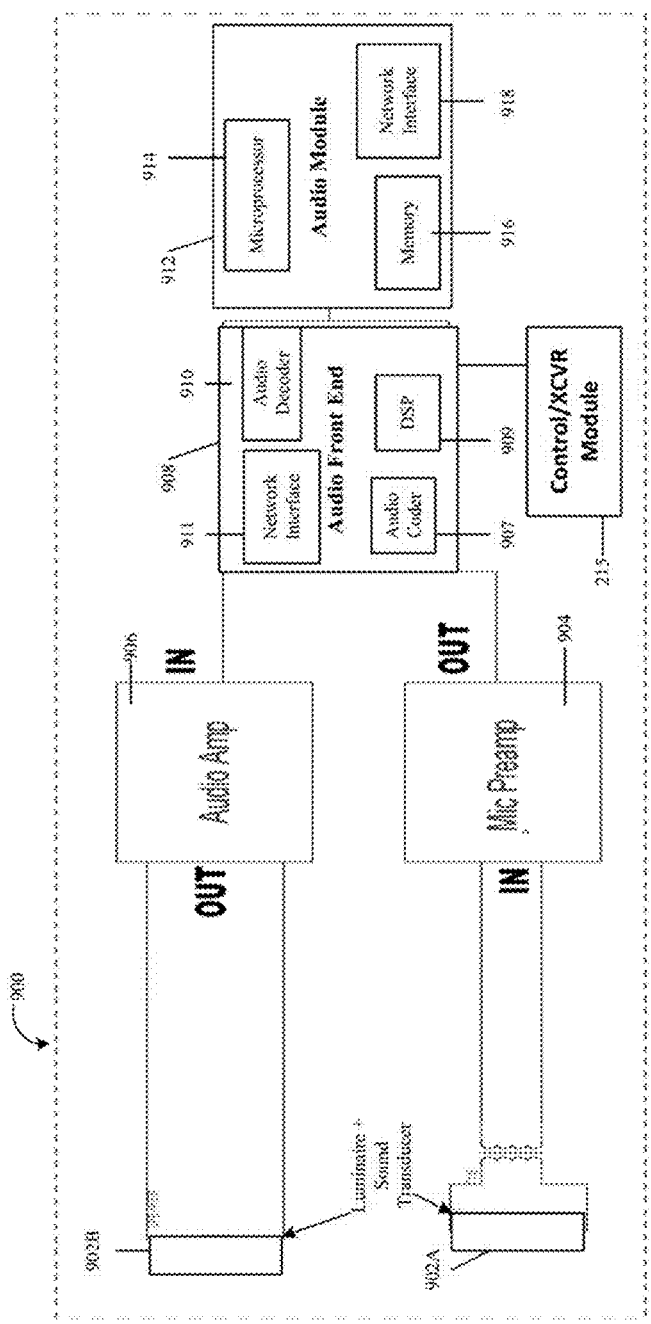
FIG. 9 illustrates example devices and circuitry for a more detailed explanation of a luminaire having two sound transducers integrated thereon with one driven to provide a microphone function and the other driven to provide a speaker function in the lighting system of FIG. 1.

FIG. 9 illustrates example devices and circuitry for a more detailed explanation of a luminaire having two sound transducers integrated on housing elements of the luminaire with one sound transducer 902A driven to provide a microphone or audio pick-up function, and the other sound transducer 902B driven to provide a speaker function, for example, in the lighting system of FIG. 1. Additional components of the luminaire such as the power supply, driver circuit, light source and control/XCVR module are a part of the luminaire, and are described above in FIG. 2. For ease of explanation, the description and illustration of these components are not repeated here. As discussed above in FIG. 5B, an example luminaire includes two housing elements or housing panels 506/508 which are susceptible to acoustic waves in a vicinity of the luminaire. As disclosed above, the housing elements may include any combination of housing panels, reflectors, waveguides, and diffusers. The luminaire further includes, for example, two sound transducers 202 integrated on a surface of each of the housing panels 506/508. Multiple sound transducers may be integrated on different panels of the luminaire to provide different functions. For example, the sound transducer 202 integrated on housing panel 506 in FIG. 5B may provide an audio pick-up or microphone function, and the sound transducer 202 integrated on panel 506 may provide an audio output or speaker function. In the implementation of FIG. 9, the luminaire 900 includes two sound transducers (902A/902B) attached to the surface of housing elements or housing panels of a luminaire. The sound transducer and luminaire 902A are configured to respond to vibrations of the panel of the luminaire. The vibrations on the panel result in acoustic or audio waves that act as a diaphragm created by the sound transducer attached to the surface of the housing panel of the luminaire. The acoustic or audio waves are converted to audio frequency electrical signals. As illustrated in FIG. 9, the sound transducer 902A is connected, via a transformer, which when driven converts the audio waves to electrical signals, to the input of amplifier 904. The amplifier 904 amplifies the audio-frequency electrical signals output by sound transducer 902A via the transformer. The amplified signals from amplifier 904 are transmitted to the audio front end device 908. In the example of FIG. 9, the amplifier 904 is located outside the audio front end device 908. In another example, the amplifier 904 is integral to the audio front end device 908.

In an implementation, the audio front end device 908 receives the analog audio signals from the amplifier 904. The amplified analog signals represent the incoming audio waves in the vicinity of the luminaire 104, as described in FIG. 1. The audio front end device 908 includes an audio coder 907 that converts the audio signals to digital input signals. A digital signal processor (DSP) 909 is coupled to the audio coder 907 to receive the digital input signals from the audio coder 907. A DSP is a programmable processor, much like a microprocessor, where the circuitry forming DSP is optimized for digital signal processing functions. The operations of the DSP 909 are configurable in response to instructions from other logic, such as microprocessor 914 of the audio module 914 and/or the control/XCVR module (lighting control device) 215, for example, to process, compress, or manipulate or perform mathematical functions like "add", "subtract," or multiply/divide.

The particular operation(s) of the DSP 909 can be selected/defined by instructions, based on a particular application or use case of the luminaire 900. The DSP 909 may utilize, for example, an adaptive algorithm to analyze a waveform of the incoming signals (converted) and/or a waveform of noise associated with the incoming audio waves represented by the digital input signals, and generates a digital output signal representing a responsive result, for example, a lighting command to control an operation of a light source in the area of the luminaire, or the digital output signal may represent at least one of a phase shifter waveform or an inverted polarity waveform relative to the waveform of the noise. When the digital output signal is processed to generate a responsive result, that is for example, a lighting command, the responsive result is supplied to the control/XCVR module (lighting control device) 215 to control an operation of the light source 206 in the area of the luminaire 104. In another implementation, the responsive result is a command to another device in the area to control additional operations in the system, for example, thermostat control, HVAC, sound systems, access and security, or other BMS operations.

An audio decoder 910 is coupled to the DSP 909, and thus receives the digital output signal from the DSP 909. In the implementation of FIG. 9, the audio decoder 910 is located in the audio front end device 908. In another implementation, the audio decoder 910 is located external to the audio front end device 908. The audio decoder 910 converts the digital output signal to an analog output signal, for example, representing a responsive result, or a waveform such as a phase-shifter waveform or an inverted polarity waveform relative to the waveform of the noise. The analog output signal is supplied to the input of amplifier 906.

An audio module 912 is coupled to an output of the audio front end device 908. The audio module 912 includes a microprocessor 914 and a memory 916. The output from the audio front end device 908 to the audio module 912 is the digital output signal from the DSP 909 The microprocessor 914 of the audio module 912 processes and stores the output signal as audio data in the memory 916. The audio data may be stored digital data in, for example, a MP3 format.

In an implementation, the processed output signal from the microprocessor 914 may be used as audio output through the sound transducer 902B. In particular, the processed output signal from the audio module 912 is supplied to the audio front end 908 for any necessary processing, DSP and/or converting to an analog signal. During the processing, the DSP may filter or modify the audio data, which is then converted by the audio decoder 910 to an analog audio signal. The analog audio signal is supplied to an input of audio amplifier 906. The audio amplifier 906 amplifies the audio signal received from the audio front end device 908 to provide an amplified audio output signal. The amplified audio output signal is supplied to the sound transducer 902B which is configured to output the audio signal in the vicinity of the luminaire.

Figure 10:
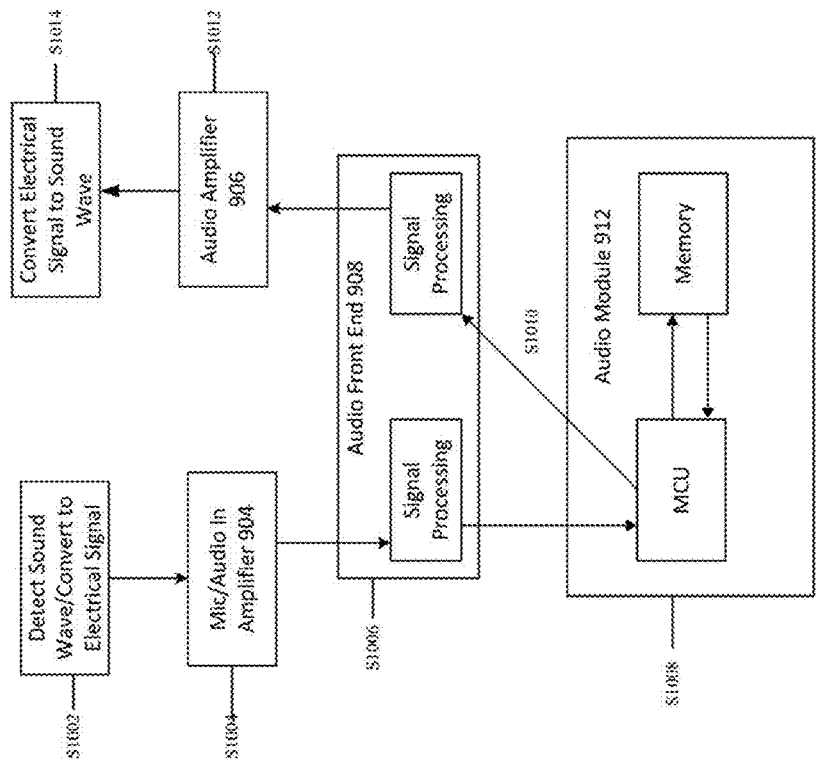
FIG. 10 illustrates an example of the signal flow of a luminaire having two sound transducers integrated thereon with one sound transducer driven to provide a microphone function and the other sound transducer driven to provide a speaker function in the lighting system of FIG. 1.

FIG. 10 illustrates an example of the signal flow of a luminaire having two sound transducers integrated thereon with one sound transducer driven to provide a microphone function and the other sound transducer driven to provide a speaker function in the lighting system of FIG. 1. As described above, for example, in FIG. 5B, two panels elements or housing panels 506/508 of a luminaire are configured to be susceptible to acoustic waves in a vicinity of the luminaire. The luminaire further includes, for example, two sound transducers 202 integrated on a surface of each of the housing panels 506/508. Alternatively, the panels may be configured as a diffuser optically coupled to an output of a light source (not illustrated) or as an integral component of the housing of the luminaire. Alternatively, one of the panels may be configured as a diffuser, and the other panel may be configured as the component of the housing, or the panels may each be different walls of the housing of the luminaire. In the example of FIG. 5B, multiple transducers may be integrated on different housing elements of the luminaire to provide different functions. For example, the sound transducer 202 integrated on housing panel 506 may provide an audio pickup function or a microphone function, and the sound transducer 202 integrated on housing panel 506 may provide an audio output or a speaker function in the lighting system. In the implementation of FIG. 9, the sound transducers are illustrated as 902A (microphone or audio pick-up function), and 902B (audio output or speaker function). The sound transducer 902A is configured to respond to vibration of the panel of the luminaire that it is attached (mechanically or adhesively). At S1002, acoustic or audio waves in the vicinity of the luminaire cause the panel of the luminaire to vibrate as the audio waves approach the surface of the luminaire. As a result, the incoming audio waves are detected. As discussed above, the sound transducer 902A is connected to a transformer which is driven to convert the incoming sound or audio waves to an audio-frequency electrical signal.

At S1004, the audio-frequency electrical signal output from the sound transducer 902 and transformer is supplied to amplifier 904 such that an amplitude of the audio-frequency electrical signal is increased.

At S1006, the amplified electrical signals are supplied to the audio front end device 908 for signal processing. In the implementation of FIG. 10, the audio front end device 908 includes an analog-to-digital converter (ADC) or an audio coder 907 that converts the analog electrical signals to digital output signals. The audio coder 907 is coupled to a digital signal processor 909 that is configured to receive the digital output signals from the audio coder 907 to generate responsive result, based upon the digital signal output signal. Audio processing at the DSP 909 includes, for example, signal conditioning, leveling, balancing, noise suppression, etc., to generate the responsive result. In the implementation of a lighting system, the responsive result, for example, a lighting command, is supplied to a lighting control device to control an operation of the light source in the area of the luminaire, for example, ON/OFF, dimming, etc. The responsive result can be transmitted to the control/XCVR module in a signal format or data communication protocol to control additional building management system (BMS) operations and functions such as thermostats, HVAC, sound systems, building access and security, etc. In an example, the responsive result may be an in the format for an audio output via the sound transducer 902B in response to audio pick-up or audio input detected at sound transducer 902A. The audio front end device 908 further includes a digital-to-analog converter (DAC) or an audio decoder 910 that converts the digital signal output signal from the DSP to an analog signal output.

At S1008, an audio module 912 is coupled to the output of the audio front end device 908 to receive the analog signal output from the audio decoder 910. The signal output from the audio front end device 908 to the audio module 912 is a digital output signal from the DSP 909. The microprocessor 914 of the audio module 912 processes the analog signal output to generate audio data that is stored as an audio file, for example, MP3 format, in memory 916.

In an implementation, the processed output signal from the microprocessor 914 may be used as audio output through the sound transducer 902B. In particular, the processed output signal from the audio module 912 is supplied to the audio front end 908 for any necessary processing and/or converting to an analog signal. During the processing, the DSP may filter or modify the audio data, which is then converted to an analog audio signal by the audio decoder 910. The analog audio signal is supplied to an input of audio amplifier 906. The audio amplifier 906 amplifies the audio signal received from the audio front end device 908 to provide an amplified audio output signal. The amplified audio output signal is supplied to the sound transducer 902B which is configured to output the audio signal in the vicinity of the luminaire.

At S1010, the processed digital output signal from the microprocessor 914 may be audio output through the sound transducer 902B. In particular, the processed output signal from the audio module 912 is supplied to the audio front end 908 for any necessary processing. During the processing, the DSP may filter or modify the audio data, which is then converted to an analog audio signal by the audio decoder 910.

At S1012, the analog audio signal is supplied to an input of audio amplifier 906. The audio amplifier 906 amplifies the audio signal received from the audio front end device 908 to provide an amplified audio output signal. At S1014, the amplified audio output signal is supplied to the sound transducer 902B, which is configured to output the audio signal in the vicinity of the luminaire.

FIGS. 11A, 11B and 11C illustrate an example of signal processing that may be used in the audio front end device to subtract a speaker's output from a total detected audio signal to provide a resulting audio signal output from the luminaire in the lighting system of FIG. 1. As illustrated in FIG. 11A, a total signal curve 1102 represents an unfiltered, incoming sound wave or signal that is detected by the sound transducer 702. The total signal curve 1102 is inclusive of an audible input, such as a human voice, in a vicinity of the luminaire, and any other noise or sounds in the vicinity. Additional sounds, for example, may include at least some expected cross-talk from other noise/sound producing objects on or near the luminaire or deployed elsewhere within the area of the luminaire. FIG. 11B illustrates an example audio wave 1104 such as cross-talk in an area. During the signal processing in the audio front end device 112, a digital signal processor (DSP) may apply an algorithm to subtract the expected cross-talk 1104 from the total signal curve 1102. After processing to remove the cross-talk or other extraneous sound, the resulting curve 1106 of FIG. 11C represents the filtered, actual sound wave of the audible input at the sound transducer. The sound wave of the audible input may be processed to more accurately detect a spoken instruction, and thereby generate an audio responsive command for use by the lighting control device, for example, to control a light source or other control operations in a vicinity of the luminaire.

The subject matter disclosed herein may be implemented in various forms or utilized in various application and is not limited to the above descriptions. For example, U.S. patent application Ser. No. 15/866,659, filed Jan. 10, 2018, titled "Occupancy Counting By Sound", the entire contents of which are incorporated herein for all purposes, discloses systems and method to determine the location of detected sound relative to the position of a microphone accessible to a light fixture. In place of the microphone of U.S. application Ser. No. 15/866,659, the disclosed sound transducer or exciter of the current application may be implemented on a surface of a panel of the light fixture in order to detect sound in an area, and to count occupants and determine a location of detected sound relative to the position of the sound transducer or exciter on the light fixture.

In another example, the disclosed sound transducer may be applied to provide active noise cancellation. U.S. application Ser. No. 15/948,401, filed Apr. 9, 2018, titled "Active Sound Control In A Lighting System", the entire contents of which are incorporated herein for all purposes, discloses a lighting system including a sound reduction device having an pick up microphone and an audio output source. The sound reduction device controls sound in an illuminated are associated with incoming sound. In place of the sound reduction device of U.S. application Ser. No. 15/948,401, at least sound transducers, as disclosed herein with one sound transducer functioning for audio pick up and the other sound transducer functioning for audio output, may be implemented on a surface of a panel of a luminaire in the vicinity of the incoming audio.

In another example, the disclosed sound transducer may be applied to provide voice assistance for lighting or building management control with light or sound feedback. U.S. patent application Ser. No. 15/933,752, filed Mar. 23, 2018, titled "Controller With Peripheral Visual Feedback", the entire contents of which are incorporated herein for all purposes, discloses a control pod for lighting or building management control with light or sound feedback that includes a user input responsive sensor configured to detect user input in an area of the control pod. Instead of using a microphone in a separate wall mounted control pod as in the Ser. No. 15/933,752 application, an example based on the present disclosure might implement the user input responsive microphone, via a luminaire mounted sound transducer or exciter as disclosed herein to detect incoming user input of a control command to cause a transmitter circuit to send a control signal to a device to implement a function corresponding to the detected control command In another example, the disclosed sound transducer may be applied to provide voice assistance for lighting or building management control with light or sound feedback. U.S. Pat. No. 631,441, filed Jun. 23, 2017, titled "Lighting Centric Indoor Location Based Service With Speech-Based User Interface", the entire contents of which are incorporated herein for all purposes, a user interface for a location based service, for example, in a retail environment, is responsive to a user's speech. Requested information may be provided as audible responses via display. The system provides appropriate responses to speech inputs based on location and/or location tracking of the user at the premises, for example, to provide navigation guidance to a selected product in a store in response to a user's spoken request. The user interface and information processing may be implemented in intelligent luminaires and/or other components of a lighting system, e.g. without direct user contact or use of the user's mobile device.

In other examples, the disclosure herein of a sound transducer implemented on a panel of a luminaire to provide audio pick up may be applied to audio based positioning for security or safety applications, for example, a sound of a gun shot, sound of broken glass, an alarm system, search and rescue, monitoring for wind, earthquake, or equipment vibrations, or other audible event can be detected by the sound transducer on a surface of a luminaire and functioning as an audio pick-up in which the incoming audio is detected and processed to provide an audio responsive command for a particular system operation or response.

In another example, the disclosure herein of a sound transducer implemented on a surface of a panel of a luminaire can be applied for sound staging for multiple luminaires in which the detection of incoming audio in a vicinity of the sound transducer and luminaire can be processed and used to project sound evenly throughout a space, or project sound in a certain direction, e.g., for direction guidance or to focus sound to a specific user.

In another example, the disclosure herein of a sound transducer implemented on a surface of a panel of a luminaire can be integrated with phone systems or to capture phone calls to project to a room for both audio pick-up and audio output functions, e.g. conference calls, with room-to-room intercoms, or to enhance person-to-person voice communication in a large room, e.g., amplify an individual speaker through an area.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system, comprising:
a data network;
a luminaire, including:
a light source;
driver circuitry coupled to the light source to provide power to the light source;
a lighting control device coupled to the driver circuitry to control a light output and operation of the light source in an area of the luminaire;
a network interface to enable the luminaire to receive communication via the data network;
a panel as an element of the luminaire susceptible to acoustic waves in the area of the luminaire; and
a sound transducer integrated on a surface of the panel of the luminaire, wherein the sound transducer is configured to respond to vibration of the panel to detect incoming audio waves in the area of the luminaire; and
an audio front end device coupled to an output of the sound transducer, the audio front end device comprising an audio coder responsive to analog signals from the sound transducer,
wherein the lighting control device of the luminaire comprises:
a processor coupled to the driver circuitry, the network interface and the audio front end; and
memory coupled to be accessible to the processor, wherein the memory stores programming for execution by the processor and data to be stored or processed by the processor during execution of instructions included in the programming,
wherein execution of the programming in the memory configures the processor to:
control the audio front end device to receive the analog signal from the sound transducer and provide a digital output signal;
perform audio signal processing of the digital output signal to generate a responsive result, based upon the digital output signal; and
supply the responsive result to the lighting control device in the area of the luminaire.

2. The system of claim 1, wherein the digital output signal is proportional to the detected incoming audio waves in the vicinity of the luminaire and reduced by a waveform of noise associated with the incoming detected audio waves.

3. The system of claim 1, wherein the audio front end device further comprises:
an amplifying device coupled to the sound transducer and to an input of the audio coder;
a digital signal processor coupled to the audio coder to:
receive digital signals from the audio coder; and
analyze a waveform of noise associated with the incoming audio waves represented by the digital input signals to generate at least one of a phase shifted waveform or an inverted polarity waveform relative to the waveform of the noise.

4. The system of claim 3, further comprising an audio module coupled to the output of the audio front end device to receive the digital signal output.

5. The system of claim 4, wherein the audio module comprises:
a microprocessor configured to process the digital signal output received from the audio front end device to provide audio data representing the incoming detected audio wave reduced by a waveform of noise associated with the incoming detected audio wave; and
memory coupled to the microprocessor, wherein the memory stores the audio data.

6. The system of claim 5, wherein the audio data is stored in a an audio coding format.

7. The system of claim 5, wherein the audio data is accessible to the processor of the lighting control device to control additional operations in the system.

8. The system of claim 1, wherein the responsive result is a lighting command to control operation of the light source.

9. A system, comprising:
a data network;
a luminaire, including:
a light source;
driver circuitry coupled to the light source to provide power to the light source;
a lighting control device coupled to the driver circuitry to control a light output and operation of the light source in an area of the luminaire;
a network interface to enable the luminaire to receive communication via the data network;
at least two panels as elements of the luminaire, the panels being susceptible to acoustic waves in a vicinity of the luminaire;
a first sound transducer integrated on a surface of a first of the at least two panels of the luminaire, wherein the first sound transducer is configured to respond to vibrations of the first panel to detect incoming audio waves in the vicinity of the luminaire; and
a second sound transducer integrated on a surface of a second of the at least two panels of the luminaire, wherein the second sound transducer is configured to output an audio signal in the vicinity of the luminaire; and
an audio front end device coupled to an output of the first sound transducer and to an input of the second sound transducer, the audio front end device comprising an audio coder responsive to analog signals from the first sound transducer,
wherein the lighting control device of the luminaire comprises:
a processor coupled to the driver circuitry, the network interface, and the audio front end device; and
memory coupled to be accessible to the processor, wherein the memory stores programming for execution by the processor and data to be stored or processed by the processor during execution of instructions included in the programming,
wherein execution of the programming in the memory configures the processor to:
control the audio front end device to receive the analog signal from the first sound transducer and provide a digital output signal;
process the digital output signal to generate a responsive result based upon the digital output signal;

supply the responsive result to the lighting control device in the area of the luminaire; and supply a portion of the responsive result having an audible component to the input of the second sound transducer for audible output from the second sound transducer.

10. The system of claim 9, wherein the digital output signal is proportional to the detected incoming sound wave in the vicinity of the luminaire and reduced by a waveform of noise associated with the incoming detected audio waves.

11. The system of claim 9, wherein the audio front end further comprises:
   a first amplifying device coupled to the first sound transducer and to an input of the audio coder of the audio front end device;
   a second amplifying device coupled to the second sound transducer and an output of an audio decoder, the audio decoder responsive to the responsive result to convert the audible component to an analog audio output from the second sound transducer;
   a digital signal processor coupled to the audio coder to:
      receive digital signals from the audio coder; and
      analyze a waveform of noise associated with the incoming audio wave represented by the digital input signals to generate at least one of a phase shifted waveform or an inverted polarity waveform relative to the waveform of the noise.

12. The system of claim 9, wherein the audio front end is coupled to the processor and memory of the lighting control device.

13. The system of claim 9, wherein the responsive result is a lighting control command to control the light output and operation of the light source.

14. The system of claim 9, further comprising an audio module coupled to the output of the audio front end device to receive an analog copy of the responsive result, wherein the audio module comprises:
   a microprocessor configured to process the copy of the responsive result to provide audio data; and
   memory coupled to the microprocessor, wherein the memory stores the audio data.

15. The system of claim 14, wherein the audio data is stored in an audio coding format.

16. The system of claim 14, wherein the audio data is accessible to the processor of the lighting control device to control additional operations of the system.

17. A system, comprising:
   a luminaire, including:
      a light source;
      a panel configured as: a reflector optically coupled to an output of the light source, a diffuser optically coupled to an output of the light source, or as an integral component of a housing of the luminaire at least partially enclosing the light source; and
      a sound transducer integrated on a surface of the panel of the luminaire, wherein the sound transducer is configured to respond to vibration of the panel to detect incoming audio waves in a vicinity of the luminaire such that the sound transducer and panel form an audio pickup device; and
   circuitry, responsive to an audio frequency output signal from the sound transducer.

18. The system of claim 17, wherein:
   the luminaire further comprises:
   another panel configured as the diffuser optically coupled to an output of the light source or as an integral component of the housing of the luminaire; and
   another sound transducer integrated on a surface of the other panel of the luminaire, wherein the other sound transducer is configured to respond to an analog audio frequency signal to produce vibration of the other panel to output audio waves in the vicinity of the luminaire such that the other sound transducer and other panel form an audio output device; and
   the system further comprises circuitry to provide the analog audio frequency signal to the other sound transducer.

19. The system of claim 17, wherein one of the panels is configured as the diffuser and the other of the panels is configured as the component of the housing.

20. The system of claim 17, wherein the panels are configured as different walls of the housing.

* * * * *